US009985975B2

(12) United States Patent
Roth et al.

(10) Patent No.: US 9,985,975 B2
(45) Date of Patent: *May 29, 2018

(54) HARDWARE SECRET USAGE LIMITS

(71) Applicant: Amazon Technologies, Inc., Seattle, WA (US)

(72) Inventors: Gregory Branchek Roth, Seattle, WA (US); Gregory Alan Rubin, Seatle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/068,446

(22) Filed: Mar. 11, 2016

(65) Prior Publication Data
US 2016/0197937 A1    Jul. 7, 2016

Related U.S. Application Data

(63) Continuation of application No. 14/149,710, filed on Jan. 7, 2014, now Pat. No. 9,292,711.

(51) Int. Cl.
H04L 29/06 (2006.01)
G06F 21/71 (2013.01)
(Continued)

(52) U.S. Cl.
CPC ........ H04L 63/108 (2013.01); G06F 12/1408 (2013.01); G06F 21/31 (2013.01);
(Continued)

(58) Field of Classification Search
CPC ............... H04L 63/108; H04L 63/0876; H04L 63/0853; H04L 63/0838; H06G 12/1408;
(Continued)

(56) References Cited

U.S. PATENT DOCUMENTS 5,179,591 A   1/1993   Hardy et al.
5,200,999 A   4/1993   Matyas et al.
(Continued)

FOREIGN PATENT DOCUMENTS

WO   WO2006077822   7/2006
WO   WO2008024705   2/2008
WO   WO2014063361   5/2014

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.
(Continued)

Primary Examiner — Joseph P Hirl
Assistant Examiner — J. Brant Murphy
(74) Attorney, Agent, or Firm — Davis Wright Tremaine LLP

(57) ABSTRACT

A hardware secret is securely maintained in a computing device. The device operates in accordance with a usage limit corresponding to a limited number of operations using the hardware secret that the device is able to perform. Once the device reaches a usage limit, the device becomes temporarily or permanently unable to perform additional operations using the hardware secret.

20 Claims, 15 Drawing Sheets

(51) Int. Cl.
   *G06F 21/31* (2013.01)
   *G06F 21/34* (2013.01)
   *G06F 12/14* (2006.01)

(52) U.S. Cl.
   CPC .............. *G06F 21/34* (2013.01); *G06F 21/71* (2013.01); *H04L 63/0838* (2013.01); *H04L 63/0853* (2013.01); *H04L 63/0876* (2013.01); *G06F 2212/1052* (2013.01)

(58) Field of Classification Search
   CPC .......... G06F 21/34; G06F 21/71; G06F 21/31; G06F 2212/1052; G06F 12/1408
   See application file for complete search history.

(56) References Cited

U.S. PATENT DOCUMENTS

| | | |
|---|---|---|
| 5,497,421 A | 3/1996 | Kaufman et al. |
| 6,084,969 A | 7/2000 | Wright et al. |
| 6,097,817 A | 8/2000 | Bilgic et al. |
| 6,185,316 B1 | 2/2001 | Buffam |
| 6,453,416 B1 | 9/2002 | Epstein |
| 6,826,686 B1 | 11/2004 | Peyravian et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard et al. |
| 7,010,689 B1 | 3/2006 | Matyas et al. |
| 7,073,195 B2 | 7/2006 | Brickell et al. |
| 7,139,917 B2 | 11/2006 | Jablon |
| 7,228,417 B2 | 6/2007 | Roskind |
| 7,320,076 B2 | 1/2008 | Caronni |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van de Horst et al. |
| 8,275,356 B2 | 9/2012 | Hickie |
| 8,321,558 B1 | 11/2012 | Sirota et al. |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,490,162 B1 | 7/2013 | Popoveniuc et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1* | 10/2014 | Hamlet ................... G06F 21/00 326/8 |
| 8,892,865 B1 | 11/2014 | Roth |
| 9,323,681 B2* | 4/2016 | Apostolides ........ G06F 12/0815 |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1* | 12/2002 | Michener ............... G06Q 20/04 705/75 |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0104265 A1* | 6/2004 | Okada ..................... G06F 21/31 235/380 |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0164848 A1 | 8/2004 | Hwang et al. |
| 2004/0172535 A1 | 9/2004 | Jakobsson et al. |
| 2005/0036611 A1 | 2/2005 | Seaton et al. |
| 2005/0043999 A1* | 2/2005 | Ji ........................ G06Q 20/202 705/21 |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0041759 A1 | 2/2006 | Kaliski et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Waleczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0034406 A1 | 2/2008 | Ginter et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0204195 A1 | 8/2008 | Diorio et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |

(56) References Cited

U.S. PATENT DOCUMENTS

| | | |
|---|---|---|
| 2009/0006862 A1 | 1/2009 | Alkove et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0083001 A1 | 1/2010 | Shah et al. |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng et al. |
| 2010/0094806 A1* | 4/2010 | Apostolides ........ G06F 12/0815 707/637 |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1* | 3/2011 | Adelman ............ H04L 63/0823 713/168 |
| 2011/0055585 A1 | 3/2011 | Lee |
| 2011/0060913 A1* | 3/2011 | Hird ........................ G06F 21/34 713/184 |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0225467 A1* | 9/2011 | Betzler ............... G06F 11/1438 714/55 |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1* | 1/2012 | Brickell ................ H04L 9/0844 713/169 |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0288089 A1 | 11/2012 | Sauerwald et al. |
| 2012/0317414 A1 | 12/2012 | Glover |
| 2013/0031255 A1 | 1/2013 | Maloy et al. |
| 2013/0086662 A1 | 4/2013 | Roth |
| 2013/0086663 A1* | 4/2013 | Roth ........................ H04L 9/083 726/7 |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1* | 8/2013 | Marien ................... G06F 21/34 713/172 |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2015/0082039 A1 | 3/2015 | Stalzer et al. |
| 2015/0089614 A1 | 3/2015 | Mathew et al. |
| 2015/0149631 A1 | 5/2015 | Lissack |
| 2016/0092671 A1 | 3/2016 | Andreeva et al. |

OTHER PUBLICATIONS

Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014, in International Patent Application No. PCT/US2014/057043, filed Sep. 23, 2014.

International Search Report and Written Opinion dated Dec. 30, 2014, in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.

Massachusetts Institute of Technology, "Kerberos V5 UNIX User's Guide," May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US2012/058083 on Dec. 27, 2012.

Roth et al., "Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

(56) References Cited

OTHER PUBLICATIONS

U.S. Appl. No. 13/431,760, filed Mar. 27, 2012.
U.S. App. No. 13/431,898, filed Mar. 27, 2012.
Wang et al., "Extending the Security Assertion Markup Language to Support Delegation for Web Services and Grid Services," IEEE International Conference on Web Services 1:67-74, Jul. 11-15, 2005.
Wikipedia, "Physical unclonable function," retrieved Aug. 22, 2013, from http://en.wikipedia.org/wiki/Physical_unclonable_function, 8 pages.

* cited by examiner

HARDWARE SECRET USAGE LIMITS

CROSS REFERENCE TO RELATED APPLICATIONS

This application is a continuation of U.S. application Ser. No. 14/149,710, filed Jan. 7, 2014, entitled "HARDWARE SECRET USAGE LIMITS," which incorporates by reference for all purposes the full disclosure of co-pending U.S. patent application Ser. No. 14/149,698, filed Jan. 7, 2014, entitled "PASSCODE VERIFICATION USING HARDWARE SECRETS" and U.S. patent application Ser. No. 14/149,721, filed Jan. 7, 2014, entitled "DISTRIBUTED PASSCODE VERIFICATION SYSTEM."

BACKGROUND

The security of resources is of importance in many contexts. Unauthorized access to various types of data, for example, can have numerous adverse consequences, such as unrealized revenue, data loss, a loss of customer goodwill, damage to reputation, and/or even civil or criminal penalties. Likewise, unauthorized access to property, whether physical property or intellectual property, can result in similar adverse consequences, including the loss of the property itself. As a result, many systems have developed over the years for controlling access to resources. An automated teller machine, for example, often requires simultaneous possession of a bank card and a personal identification number (PIN). Various websites and other services provided over the Internet and other networks often require users to enter passwords before certain types of access are granted. Even access to real property often requires proof of possession of some type of credential (e.g., PIN, password, physical key and/or possession of an access card) before access is granted.

In many contexts, it is difficult to find a balance between security and usability. In the case of passwords, for example, users often select passwords to be easy to remember. Typically, this means that passwords contain some type of semantic meaning to their holders. Similarly, PINs often are of a small number of digits (e.g., 4) and also often picked to have some sort of semantic meaning. Therefore, the size of a password space and/or the number of passwords that users actually use is relatively small, making certain types of security attacks (e.g., automated password guessing) more likely to succeed.

BRIEF DESCRIPTION OF THE DRAWINGS

Various embodiments in accordance with the present disclosure will be described with reference to the drawings, in which.

DETAILED DESCRIPTION

Figure 1:
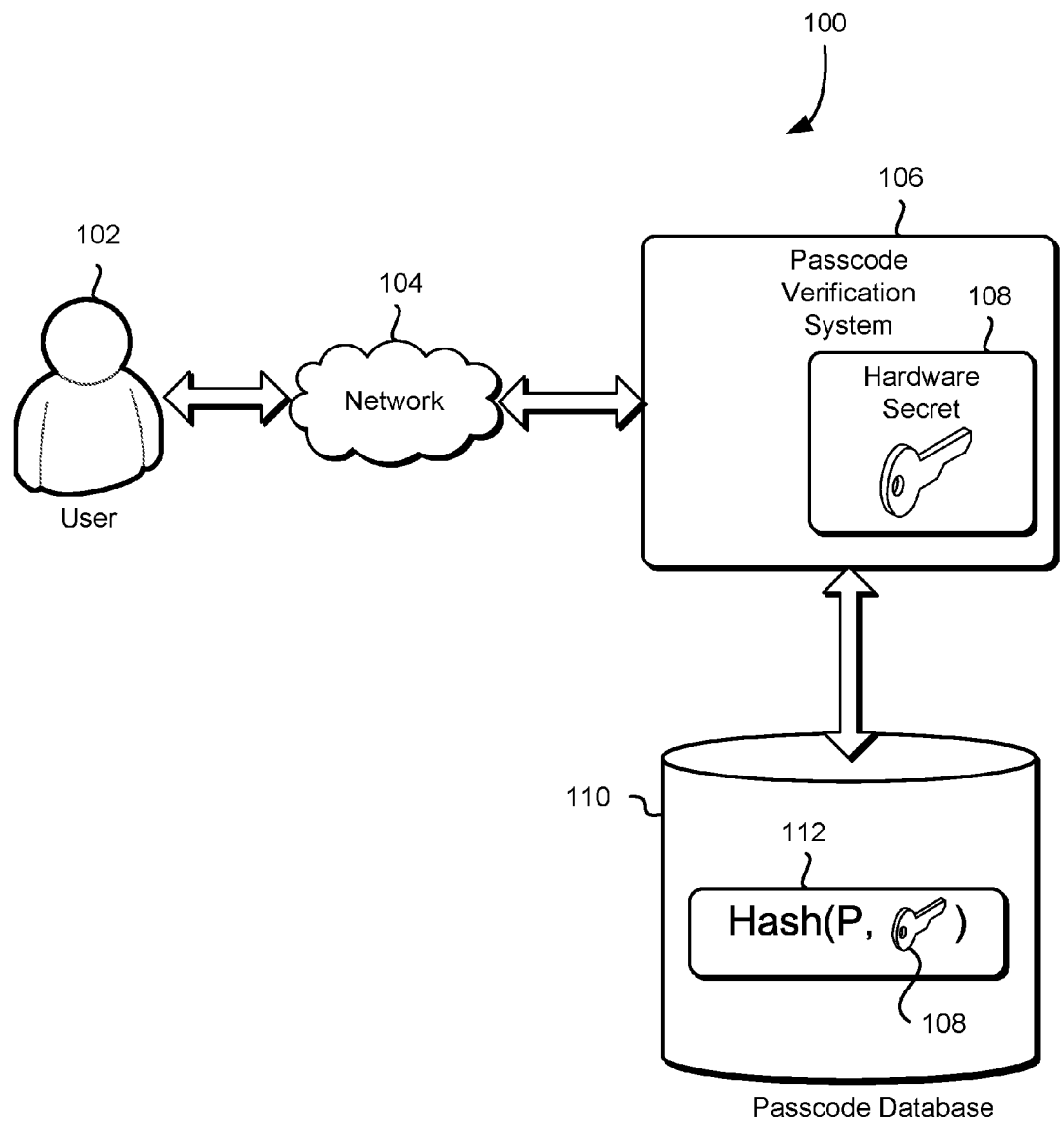
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of securely maintained secret information in various authentication methods. The methods may be used as a mechanism to control access to various resources, such as data, physical items, real property, currency and others. In an embodiment, a passcode (e.g., password) hash value (which may be referred to simply as a "hash") is calculated using a hardware secret that, as discussed in more detail below, may be information to which access, outside of a module configured to perform calculations with the information, is extraordinarily difficult or even effectively impossible. The calculated hash may be used to populate an entry in a database of passcode hashes that associates hashes of passcodes with corresponding identities. When a passcode of an identity (e.g., user) is provided for verification (i.e., when a purported passcode is provided), a reference hash (generally, "reference value") of the passcode may be calculated based at least in part on the passcode and the hardware secret. The calculated reference hash may be compared to a stored passcode hash in the database. If the calculated reference hash matches the stored passcode hash, the received passcode may be considered to be verified and a system relying on such verification may operate accordingly.

The hardware secret, as noted, may be secret information that is securely maintained and used for calculating password hashes. The hardware secret may be configured such that the hardware secret has a value from a set of values that has a specified size. For example, the size of the set may be configured such that the cardinality of the set is larger than the cardinality of a set of possible passcode values. Generally, the size of the set may be selected to prevent cryptographic attacks. As an example, the size of the set may be selected so that assumed amounts of processing resources (which may be based at least in part on estimates of current or future capabilities) collectively working to determine a passcode from a given hash of a passcode would, probabilistically speaking, be extremely unlikely to determine the passcode in a specified reasonable amount of time, where the probability may be a specified value set at some acceptable threshold. As an illustrative example, the size of the set may be such that all processing capacity on Earth, if collectively working to determine a passcode from a hash value, would have a probability of less than a 0.0000000001 of determining the passcode in one hundred years. Of course, the particular example values given are for illustration, and generally any size set may be used. In some embodiments, for example, the set of possible hardware secrets is chosen to have at least $2^{256}$ members. In this manner, mere access to the information stored in a database of passcode hashes does not provide opportunity to determine passcodes from hashes, thereby enabling unauthorized presentation of a passcode for the purpose of illegitimately gaining access to a resource. On the contrary, such a cryptographic attack is infeasible, even if parallelization techniques are utilized.

Various embodiments of the present disclosure also provide for additional security of passcodes. For example, as implied above, in embodiments where the size of the set of possible hardware secrets is sufficiently large, cryptographic attacks are more likely to succeed by guessing the passcodes themselves since passcodes, relatively speaking, are from a much smaller space of possible values, especially when considering that users often select passcodes with semantic meaning and, generally, passcodes that are easy to remember. To prevent such attacks even when an attacker has gained access to and control over the device having the hardware secret, the device may be configured with particular performance characteristics that render such attacks infeasible. As one example, a hardware secret may be used to ensure that a work factor (e.g., amount of time or number of operations needed to determine guess a passcode) is statistically large. For example, the hash of a passcode may require iterative use of the hardware secret, possibly for thousands or millions of operations. In this manner, each guess at a password may require a number of operations (and a corresponding amount of time). The work factor may be configured such that the computational work required to calculate a password hash is insignificant for authorized uses of a system (e.g., a user providing a password to gain access to a resource), but significant for unauthorized uses (e.g., repeatedly guessing different passwords). For example, calculations that take several milliseconds may be insignificant to a human user, but may cause significant delay for cryptographic attacks requiring numerous password guesses.

As another example, a device using a hardware secret to calculate passcode hashes may be configured to perform only a limited number of operations. Generally, such a device may be configured to operate in accordance with one or more usage limits applicable to use of the hardware secret in the performance of operations. A usage limit may be or otherwise correspond to, for example, a limit (quota) on a number of operations that may be performed using the hardware secret. A usage limit may also be or otherwise correspond to a limit on a rate on which a device is able to perform operations using the hardware secret, such as a limit on a number of passcode verifications and/or decryptions performable by the device in a specified amount of time (e.g. month). A device may be configured to operate in accordance with multiple usage limits and/or types of usage limits. For example, a hardware device may have multiple hardware secrets, each with a corresponding usage limit, where each usage limit may be the same or where the usage limits may differ among the hardware secrets of the hardware device. Usage limits may be different from clock rates limits for processors of devices subject to the usage limits. For example, a usage limit may cause a device to be able to perform operations at a rate that is slower than the device is physically capable of in accordance with a current clock rate limit setting for its processor. In other words, a usage limit for a hardware secret of a device may be configured such that operations using a hardware secret must be performed at a rate that is slower than a processor of the device is currently capable of performing the operations.

In some embodiments, the number of operations performable in accordance with a usage limit is deterministically determined (e.g., set in programming logic). A device may, for instance, be configured to perform self-destructive actions after performing a programmed number of operations. The limit may be probabilistically determined in some embodiments. For example, certain computing resources (e.g., computer memory) wears out and fails after a number of operations (e.g., write operations) where the number may not be consistent across devices. Algorithms for calculating passcode hashes may be configured to cause a device to, statistically speaking, wear out after a certain number of operations. The number of operations, whether deterministically or probabilistically set, may be configured such that, the device is able to perform a specified sufficient number of operations (e.g., a number of passcode verifications the device is expected to legitimately perform during its lifetime or during a specified amount of time). Cryptographic attacks involving password guessing, however, may require many more password verification attempts than the device is expected to legitimately perform in a lifetime. Accordingly, the number of operations may also be set to cause a device to fail before a cryptographic attack involving password guessing has more than some specified probability of succeeding by guessing a correct passcode for a given hash.

Other mechanisms may also be used to prevent successful cryptographic attacks, even with control over a device having a hardware secret used to calculate password hashes. For example, processors may be deliberately configured and/or selected to be, relatively speaking, slow. Slow processing capability may be insignificant to a human user, but slower speeds correlate with attacks that proceed slower and, therefore, require more time on average before successfully determining a passcode from a hash. Other techniques and combinations of techniques may also be used.

Generally, other variations are considered as being within the scope of the present disclosure. For example, in some embodiments, hardware secrets are used in one-time passcode/password (OTP) schemes. A security token may be a device or programming module configured to deterministically generate passcodes based at least in part on a seed value (which may be referred to as a "seed") and a time, which may be a time of passage since some reference time (e.g., token creation or Unix time). At predefined times (or otherwise for multiple times during a duration of time), the token may generate a new passcode based at least in part on the seed and the time. A passcode provisioning system may be configured to likewise deterministically calculate the same codes (e.g., a finite number of codes that the token will produce), although in advance. The codes may be provided to an OTP verification system which may then use a hardware secret to calculate, for the calculated codes, passcode hashes. The passcode hashes may be stored in a database used to verify passcodes provided using the token. In this manner, instead of the OTP verification system generating the codes itself for verification, the seed may be securely kept from the OTP verification system, thereby reducing the likelihood that the seed may be accessed without authorization and that, as a result, the token 504 can be cloned. In other words, the OTP verification system does not need the seed because it already has hash values of the codes it will need to verify. As a result, a system employing the techniques of the present disclosure is more secure than systems employing many conventional techniques.

FIG. 1 shows an illustrative example of an environment in which various embodiments may be practiced. In the environment 100 illustrated in FIG. 1, a user 102 communicates over a network 104 with a passcode verification system 106, which may be implemented as a verification server that receives verification requests, generates responses to the requests and provides responses to the requests. The user may communicate with the passcode verification system 106 by way of one or more customer devices and/or interfaces such as those described below. The network 104 may be any suitable communications network such as the Internet or another network discussed below or combination of networks. It should be noted that while the user 102 is shown as communicating directly with the passcode verification system 106, communication with the passcode verification system 106 may be indirect. For instance, the passcode verification system 106 may be a backend system of another system with which the user 102 communicates. Further, while FIG. 1 shows communication with the passcode verification system 106 by way of a network 104, communication with the passcode verification system 106 may occur without a network 104. For instance, the user 102 may communicate with the passcode verification system 106 via a local interface (e.g., one or more user input devices) of a system on which the passcode verification system 106 is implemented.

The user 102 may communicate with the passcode verification system 106 for any purpose involving the use of passcodes. A passcode may be information usable to access one or more resources. An example passcode is a password which comprises a string of one or more alphanumeric characters which may be chosen by a user, perhaps in accordance with one or more rules regarding length, complexity and the like. Another example passcode is a PIN. While passwords and PINs are used extensively throughout the present disclosure for the purpose of illustration, the term passcode is intended to be interpreted broadly to cover other types of information usable to access a resource which may or may not be information that a user may know. Example information includes biometric information, demographic information and/or, generally, any information which may correspond to a user, possibly uniquely. Example uses for passcodes include, but are not limited to, access control to data, causing the performance of one or more operations and/or generally access to any resource including physical resources, such as money, in embodiments where the passcode verification system 106 is part of a money dispensing system such as an ATM.

As illustrated in FIG. 1, in an embodiment the passcode verification system utilizes a hardware secret 108. A hardware secret may be secret information maintained by a device such that there is no legitimate way to access the hardware secret. For example, the hardware secret may be encoded in hardware of a hardware device that employs various security measures. The hardware device for example may be tamper resistant, tamper evident and/or generally may employ mechanisms that prevent physical intrusion into the device to obtain the hardware secret. In other words, the hardware secret may be maintained such, so as to be obtainable without physical intrusion into a device that has access to the hardware secret, if such physical intrusion is even possible. In other words, the hardware secret may be maintained such that any processor external to the device is unable to execute code that allows the processor to obtain the hardware secret in an authorized manner. Accordingly, a hardware secret may be maintained by the device so as to be programmatically unexportable (i.e., such that there is no legitimate way to programmatically cause (e.g., through an interface of the device) the device to provide the hardware secret). The hardware secret may be maintained, for example, such that there is no request mechanism (e.g., application programming interface (API) call) for causing hardware, storing the hardware secret, to reveal the hardware secret. As an example, a device storing the hardware secret (e.g., cryptographic module) may be configured to lack an ability to provide a copy of some or all of its memory such that the copy includes the hardware secret. It should be noted however, that while hardware secrets, for which there is no legitimate way of obtaining the hardware secret, are used throughout the disclosure for the purpose of illustration, some hardware secrets may be maintained, such that the hardware secret is obtainable through a limited number of authorized uses, which may require various security protocols to be employed and able to prevent unauthorized access to the hardware secret. Generally, a hardware secret is information (e.g., one or more cryptographic keys) for which extraordinary measures must be taken to obtain the hardware secret, if it is possible at all to obtain the hardware secret.

As illustrated in FIG. 1, the environment 100 includes a passcode database 110 or, generally, persistent data storage for information based at least in part on passcodes. The passcode database 110 may be a data storage system with which the passcode verification system 106 communicates for the purpose of storing hash values of passcodes. The passcode database 110, for example, may store hash values of passcodes for multiple users 102 in association with identifiers for the users, thereby allowing for passcodes submitted by users to be verified. The passcode database 110 may be implemented in various ways. For example, the passcode database 110 and passcode verification system 106 may be different computer systems that communicate with one another over a network. In other embodiments, the passcode database 110 is a local storage devise of passcode verification system 106. Numerous variations are also considered as being within the scope of the present disclosure, such as variations where the passcode verification system 106 includes both a separate passcode database and a local cache of passcode hashes.

As illustrated in FIG. 1, hashes in the passcode database are generated, based at least in part, on a passcode and the hardware secret 108. The passcode verification system 106 may, for example, upon receipt of a new passcode from a user 102 or generation of a new passcode for the user 102, calculate a hash of the passcode, based at least in part, on the passcode and the hardware secret. The hash of the passcode may be computed in various ways in accordance with various embodiments. Generally, the hash of the passcode may be calculated, based at least in part, on output of one or more one-way functions. Example one-way functions include, but are not limited to secure hash functions, such as MD5, as those classified as secure hash algorithm two (SHA-2) such as SHA-224, SHA-256, SHA-384 and SHA 512. For example, the hash of the passcodes may be or otherwise may be based at least in part on a keyed-hashed message authentication code (HMAC) such as HMAC_MD5, HMAC-SHA-2 (where HMAC-SHA-2 denotes HMAC using a SHA-2 function). Other example password hashes include password based key derivation functions (PBKDFs) such as PBKDF2 and Bcrypt. It should be noted that the term "one-way" is used in the practical sense and is not necessarily limited to functions within the strict mathematical definition of one way functions. Generally, as used herein, one-way functions are functions satisfying one or more conditions on invertability. For example, the one or more conditions may be that the probability of a random input, generating a given output, is within some bound specified as acceptable or, generally, is believed to be (e.g., as a result of experimentation) within some bound specified as acceptable. In some instances, a function may be considered one-way if there is no known formula or algorithm or for the calculating the inverse.

Other functions and values, based at least in part on the output of the functions, are considered as being within the scope of the present disclosure. Generally, a hash of a passcode is intended to cover the output of any function that takes as input at least a passcode and another value (e.g., hardware secret) and provides output that is a transformation of the passcode to another value. Further, the function may be configured to have an effect on the number of computations required to calculate the function. For example, in some instances the function is configured as a composite function, where computation of the function requires the output of one function to be used as the input to another function, possibly iteratively. The number of iterations of a sub-process involved in calculating the value of a function may be a tunable parameter. In this manner, the amount of computational resources may be configured to avoid the speed at which brute force and other attacks are able to verify password guesses.

The passcode verification system 106 may provide the passcode or information based thereupon to a cryptographic module of the passcode verification system 106 that stores the hardware secret 108. The cryptographic module may be a system configured to securely store and perform operations using one or more hardware secrets. The cryptographic module may be a locally attached device of a computing device, used to implement the verification system 106, or a redundant node thereof or may be a device accessible to the verification system 106 over a network. When implemented as a hardware device, either locally attached or remotely accessible, the cryptographic module may also be referred to as a cryptographic hardware module. Example cryptographic modules are discussed in more detail below. Upon receipt of the password or information based at least in part thereon, the cryptographic module may calculate the hash based at least in part on the hardware secret and information provided from the passcode verification system. The cryptographic module may provide the calculated hash to the passcode verification system, which may then transmit the hash to the passcode database for persistent storage.

As discussed in more detail below, when the user 102 provides a passcode, such as to authenticate or otherwise access one or more services, the user may provide the passcode to the passcode verification system over the network 104. Various secure protocols, such as transport layer security (TSL) and/or socket layer security (SSL), may be used to transfer the passcode from the user 102 to the passcode verification system 106 to avoid sending the passcode over the network 104 in cleartext (plaintext) form. Further, while the user providing a passcode is used throughout for the purpose of illustration, the scope of the present disclosure is intended to cover additional embodiments where the information the user provides for authentication (authentication information) is the passcode or is otherwise based at least in part on the passcode. Example embodiments include those where a passcode input by a user, is transformed before providing to a verification system and, similarly, before the verification system generates a hash for persistent storage. Further, human operator users are depicted in the drawings for illustration, passcodes may be provided by automated systems whether or not the passcodes were provided concurrently by the users themselves.

The passcode verification system 106 may receive the passcode from the user 102, decrypt if necessary, and provide the passcode to a module having the hardware secret to cause the cryptographic module to calculate a hash of the passcode using the hardware secret 108. A result provided from the cryptographic module may be compared by the passcode verification system 106 with a stored hash 112 of the passcode in the passcode database 110. If the calculated hash value and the stored hash value match, it may be considered that the user has successfully validated the passcode (e.g., provided a correct passcode). One or more actions corresponding to successful validation may be performed, such as by providing access to one or more resources.

Figure 2:
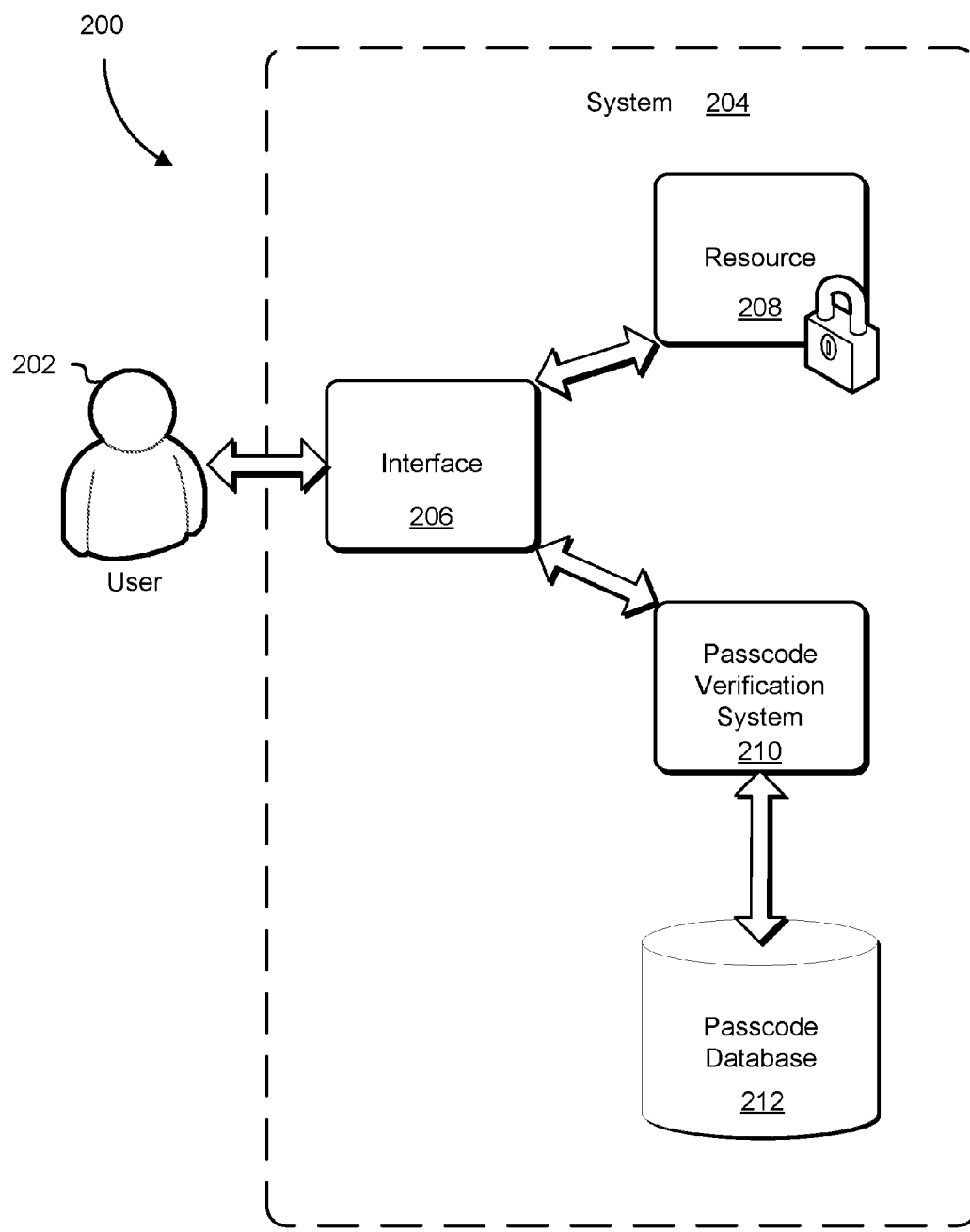
FIG. 2 shows an illustrative example of an environment in which various embodiments can be implemented.

FIG. 2 shows an illustrative example of an environment 200 in which various embodiments may be practiced. In the environment 200, a user 202 communicates with the system 204. The system 204 and, therefore, how the user 202 communicates with the system 204 may vary in accordance with various embodiments. For example, the system 204 may provide access to information through a website and, as a result, communication may include various ways of website navigation. As another example, the system 204 may be an ATM and, as a result, communication may include interaction with a local physical interface (e.g., keypad, touchscreen, card reader and/or near-screen buttons) of the ATM. As yet another example, the system 204 may be a computing device usable to control access to certain premises, such as through an automated mechanical gate or door. Generally, the system may be any suitable system for which passcodes are used for one more purposes, such as granting access to something for which access is obtainable (e.g., required) by providing a correct passcode.

As noted, in an embodiment, the system 204 includes an interface 206 and the interface 206 may vary as the system 204 varies in accordance with the various embodiments. In some examples, the interface 206 is a web interface and the user 202 communicates with the interface 206 over a network, such as the internet. Communication with the web interface may occur, for example, via a web browser or other application. In some embodiments, the user 202 interacts with the system 204 while in geographic proximity with the system 204. For example, the system 204 may be an ATM and the interface 206 may be a combination of input devices (e.g., keypad, near-screen buttons, touchscreen, card reader and the like) and/or display devices that enable the user 202 to provide input to the system 204. Similarly, the system 204 may be a mobile device, such as a tablet computing device and/or cellular telephone (smart phone) having a touchscreen, keyboard and/or other input device usable by the user 202 for providing input. Generally, the interface 206 may be any collection of computing resources which may include input devices, display devices and/or generally devices that are able to receive remotely and/or locally generated data into the system 204 for processing.

In an embodiment, the interface 206 enables communication with various components with system 204 to provide the user 202 access to a resource 208. The resource 208 may be any resource by which correct presentation of a passcode is a prerequisite for access. Examples, as noted above, include money, data, physical items, services, real property and other resources. Other examples include functions on a computing device (e.g., mobile device, tablet device or personal computer). For instance, a user may use an interface to enter a passcode to unlock a mobile device to access applications of the device, operating system functions and the like. Until a passcode is entered, the device may offer a more limited functionality. Of course, the various embodiments of the present disclosure are not limited to the specific resources explicitly described herein but extend to other types of resources as well.

As noted above, the user 202 interacts with the interface 206 for the purpose of accessing the resource 208. As illustrated by the lock symbol on the resource 208, the resource 208 may be protected by the system from unauthorized access through one or more access control mechanisms. In order to do this, the interface 206 may be configured to require that the user 202 provide a passcode. The interface 206 may receive the passcode from the user 202 and provide the passcode to a passcode verification system 210. The passcode verification system 210 may be a component of the system 204, such as described above in connection with FIG. 1. The passcode verification system, for example, may be implemented as a separate computing device, a programming module on a computing device, a hardware module on a computing device and/or on other ways. The passcode verification system 210, may have access to a passcode database 212, which may store hashes of passcodes. As discussed above in connection with FIG. 1, the passcodes may be generated based, at least in part, on a hardware secret, where the hardware secret may be maintained by the passcode verification system 210 or by another entity with which the passcode verification system 210 is able to communicate.

As noted above, when the user 202 presents a passcode through the interface 206, the passcode verification system 210 may generate, or cause to have generated, a hash of the passcode based at least in part on the passcode and a hardware secret and then compare the generated hash with a hash stored in the passcode database 212. If the generated hash and the stored hash match, the user 202 may be provided access to the resource 208. If, however, the generated hash and the stored hash do not match, the user may be denied access to the resource 208, at least until the user is able to provide a correct passcode or otherwise authenticate.

Figure 3:
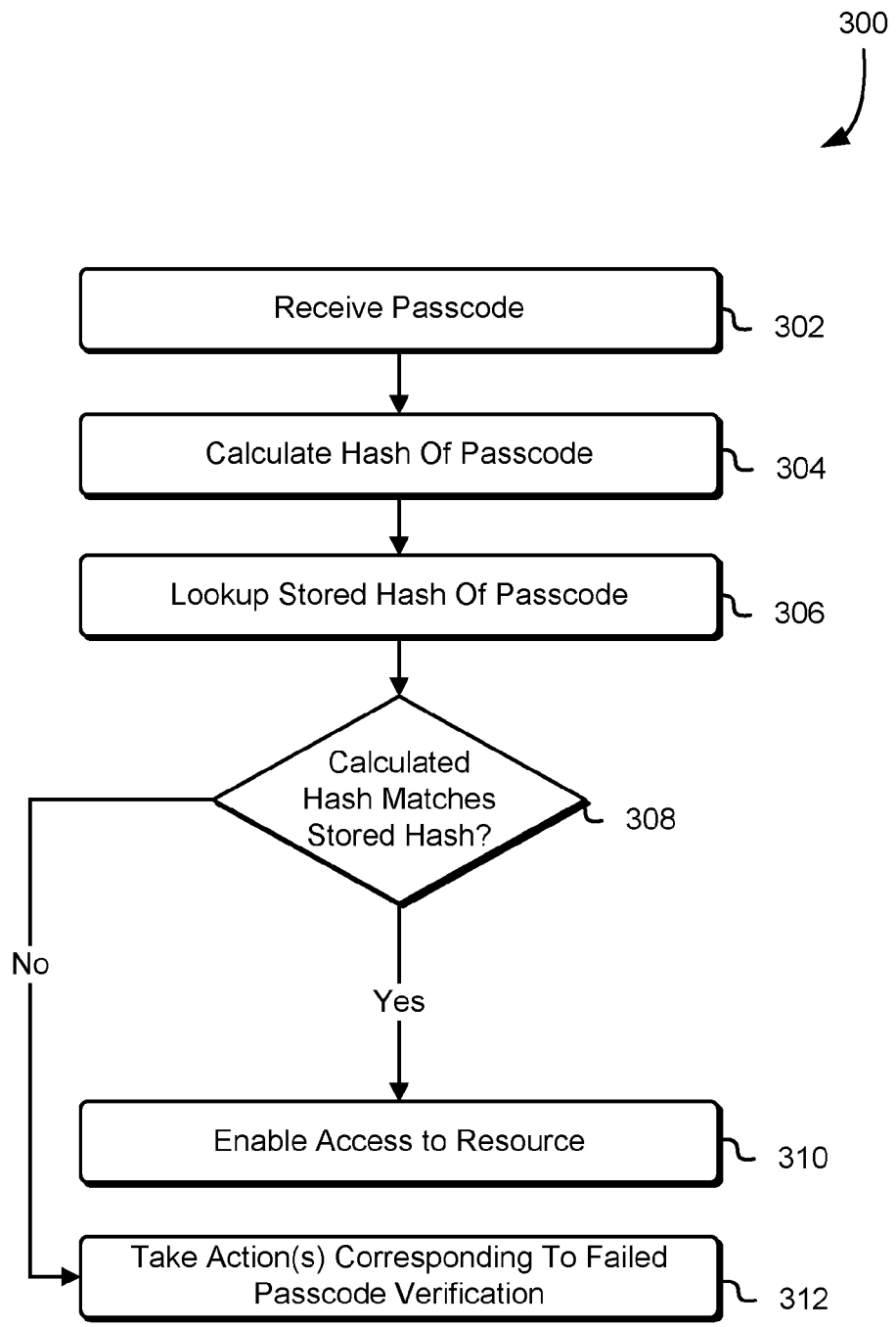
FIG. 3 shows an illustrative example of a process for controlling access to a resource in accordance with at least one embodiment.

FIG. 3 shows an illustrative example of a process 300 which may be used to verify a passcode received from a user, such as described above. The process 300 may be performed by any suitable system or component thereof, such as by a passcode verification system described above. In an embodiment, the process 300 includes receiving 302 a passcode. The passcode may be received in various ways in accordance with various embodiments. As another example, the passcode may be received as a result of a user having input the passcode one or more input devices of a system with which the user interacts. As another example, the passcode may be received over a network, perhaps through one or more components, such as a webserver and/or application server, such as described below. Generally, the passcode may be received 302 in any manner.

In an embodiment, the process 300 includes calculating 304 a hash of the passcode. Calculating the hash of the passcode may be performed by inputting the passcode and a hardware secret and, in some embodiments, other information, such as a salt into a hash or other function, such as described above. Generally, the hash of the passcode may be calculated in any way. Further, while various embodiments of the present disclosure use hashes and hash function for the purpose of illustration, other functions not necessarily commonly categorized as hash functions may be used. For example, as noted, generally any type of one-way function may be used to generate a value based, at least in part, on the passcode and a hardware secret.

In an embodiment, the process 300 includes looking up 306 a stored hash of the passcode. The stored hash of the passcode may be stored in memory of a computer system, such as in volatile or nonvolatile memory of a data storage device locally attached to the system performing the process 300 or remotely accessible to the system performing the process 300. Looking up 306 the stored hash may also include querying a local or remote database. It should be noted that while FIG. 3 illustrates calculating the hash of the passcode and looking the stored hash in a particular order, as other operations described herein, various embodiments of the present disclosure are not necessarily limited to the order in which the operations are illustrated. For example, in some embodiments the stored hash may be looked up before the hash of the passcode is calculated or the look up and the calculation may be performed in parallel. Generally, the order of operations discussed herein are not necessarily performed in the order illustrated unless explicitly stated otherwise or otherwise clear from context. Further, while particular operations on specific data (e.g., passcodes, hardware secrets, salts and the like) are used for the purpose of illustration, such operations may more generally be based in part on such data. The performance of additional operations not described explicitly herein is also considered as being within the scope of the present disclosure.

In an embodiment, the process 300 includes determining 308 whether the calculated hash matches the stored hash. For example, by determining whether the calculated hash and stored hash are equal or otherwise match. If it is determined 308 that the calculated hash matches the stored hash, the process 300 may include enabling 310 access to a resource. As noted above, the resource may vary widely in accordance with various embodiments and enabling access may accordingly vary. For example, enabling access may include the transmission of one or more signals (e.g., messages) that indicate to another component of a system (e.g., server, operating system, automated mechanical device (e.g., lock), application and/or other possible components) to allow access. As an example, enabling access to the resource may include transmitting one or more signals that enables an application on an ATM to allow a user to obtain money from the ATM when the process 300 is performed as part of an access control mechanism for money stored in the ATM. As yet another example, enabling access to the resource may include transmitting one or more signals that, when received by an operating system process of a device, cause the operating system to provide additional functionality. Other examples are also considered as being within the scope of the present disclosure.

Referring back to FIG. 3, if it is determined 308 that the calculated hash does not match the stored hash, the process 300 may include taking 312 one or more actions corresponding to failed passcode verification. The one or more actions may include, for example, transmitting one or more signals causing access to the resource to be denied or simply not transmitting signals that, if transmitted, would enable access. Other operations, such as providing a message indicating that the passcode is incorrect may also be performed. In addition, various embodiments of the present disclosure may be used in conjunction with other access control mechanisms and the one or more actions corresponding to the failed passcode verification may also involve other access control mechanisms. For instance, in some embodiments a limited number of failed passcode attempts are allowed before an adverse event occurs. The adverse event may include, for example, a lockout (e.g., inability to try another passcode) for a predetermined amount of time, destruction of data (e.g. by erasing), and/or generally some type of adverse consequence which either renders the resource inaccessible, temporarily or permanently, or which makes the resource more difficult to access by the user, such as by requirements for additional authentication operations. In some embodiments, accordingly, the one or more actions corresponding to a failed passcode verification may include, for instance, updating a counter of failed passcode attempts. If the counter has already reached a threshold, the one or more actions may include causing one or more adverse events to occur. Other actions considered as being within the scope of disclosure include, but are not limited to, recording a failed passcode attempt, providing notification of a failed passcode attempt, causing a delay before another passcode attempt is permitted and/or other actions.

While FIG. 3 shows an illustrative example of a process for verifying a passcode, other processes are considered as being within the scope of the present disclosure. For example, processes in accordance with the secure remote passcode protocol (SRP) and variations thereof are considered as being within the scope of the present disclosure. Generally, various techniques described herein may be adapted to various ways of performing passcode verification.

Figure 4:
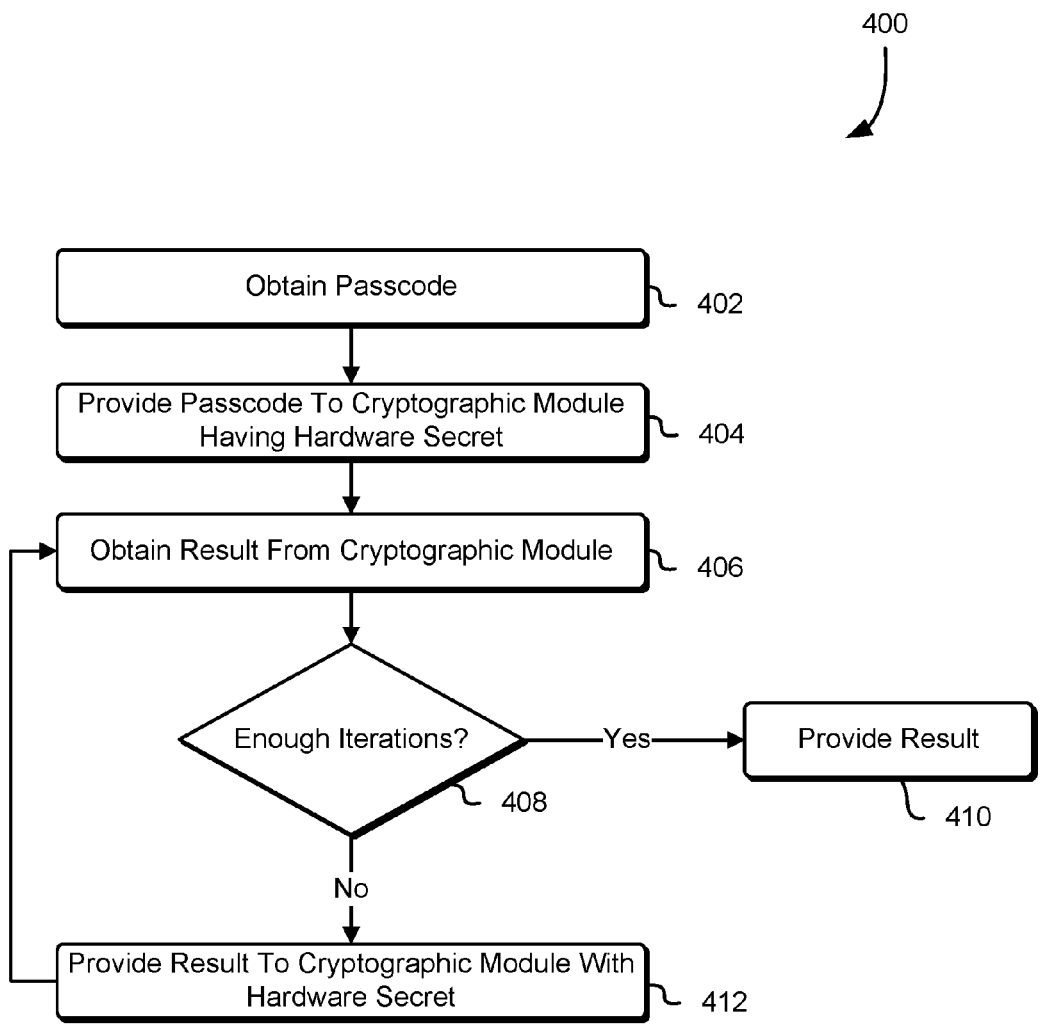
FIG. 4 shows an illustrative example of a process for generating a hash from a passcode in accordance with at least one embodiment.

FIG. 4 shows an illustrative example of a process 400 which may be performed in order to generate a passcode hash in accordance with an embodiment. The process 400 may be performed by any suitable system or component therein. For example, the process 400 may be performed by password verifier having access to a local or remote cryptographic module having a hardware secret, such as described above. The process 400 may be performed in various contexts. For example, the process 400 may be performed to populate a passcode database when a new passcode is received from, generated for or otherwise obtained for a user. The process 400 may also be performed in order to verify a passcode provided by a user. In an embodiment, the process 400 includes obtaining 402 a passcode. The passcode may be obtained 402 in various ways in accordance with various embodiments. For example, the passcode may be obtained through internal communications within a computing device that has received or otherwise obtained the passcode. As another example, when the passcode may be obtained 402 over a network. Generally, the passcode may be obtained in various ways in accordance with various embodiments and, in general, the various contexts in which the process 400 is performed.

In an embodiment, the process includes providing 404 the obtained passcode to a cryptographic module having a hardware secret where the hardware secret may be described as above. Providing 404 the obtained passcode may be performed in various ways depending on the relationship between the cryptographic module and the system performing the process 400. For example, if the cryptographic module is an internal hardware module of the system performing the process 400, providing 404 the passcode may be performed by making a local device-level call to the cryptographic module. As another example, if the cryptographic module is remotely accessible over a network to the system performing the process 400, appropriately formatted network communications may be used to provide the passcode to the cryptographic module. In some embodiments, the cryptographic module is operated by a cryptography service with a web service interface and providing 404 the passcode may be performed via an appropriately configured web service API call. Other variations are also considered as being within the scope of the present disclosure.

A result may be obtained 406 from the cryptographic module. The result may be one or more values generated by the cryptographic module based, at least in part, on the information provided to the cryptographic module and the hardware secret. A determination may be made 408 whether there are enough iterations (i.e., if enough iterations of an iteratively performed calculation involving the passcode and hardware secret have been performed). For example, the cryptographic module may be configured to input information (e.g., passcode or results from a previous result received from the cryptographic module) from the system performing the process 400 into a function (which may itself be iterative within the cryptographic module), such as described above. For a performance of the process 400, each time the system performing the process 400 provides information involving the obtained 402 passcode to the cryptographic module for input with the hardware secret into the function may be considered an iteration for the purpose of the process 400, although other definitions of iteration may be used. Whether enough iterations have been performed may be determined 408 by comparing a count of iterations against a preprogrammed parameter corresponding to a number of iterations. The parameter may, in some embodiments, be configurable, e.g., by a human operator having administrative or other access sufficient for setting the parameter. The number of iterations to be performed may be set based at least in part on physical capabilities of the cryptographic module and/or the system performing the process 400. For example, higher numbers may be set to cause the time to verify a password to exceed a specified minimum time, thereby impeding the speed at which unauthorized attempts at password verification are able to be performed.

If it is determined 408 that a sufficient number of iterations have been performed, the result from the cryptographic module or information based at least upon the result from the cryptographic module may be provided 410. The manner in which the result is provided may vary in accordance with the various contexts in which the process is performed. For instance, providing 410 the result may involve internal device communications encoding the result, network communications encoding the result and/or other operations.

If, however, it is determined 408 that an insufficient number of iterations have been performed then a result from the cryptographic module may be provided 412 to the cryptographic module with the hardware secret. As noted, the result may be used by the cryptographic module as input into a one-way function in order to iterate the process and generate another value. This process of providing the cryptographic module a result obtained from the cryptographic module (or information based at least upon a result received from the cryptographic module) may be repeated until it is determined 408 that a sufficient number of iterations have been performed. Once determined 408 that there are enough iterations as noted above the result may be provided, such as described above.

In this manner, calculating a hash of a passcode may require numerous calls to a module with a hardware secret and generally may require numerous operations thereby making the calculation relatively slow. In this manner, unauthorized attempts to guess the passcode may require computer resource usage which, in the context of normal passcode verification operations, such as when a user supplies a passcode to obtain access to a system, is insignificant, but for which cryptographic attacks which involve multiple guesses of the passcode is significant.

It should be noted that variations of the process 400 are considered as being within the scope of the present disclosure. For example, the process 400 as illustrated is configured to require multiple calls to a cryptographic module in order to ultimately determine the hash of a passcode based at least in part on the passcode and a hardware secret. Other variations include those where the passcode is provided to the cryptographic module and the cryptographic module performs a specified number of iterations before providing a result back. Other variations including those where the cryptographic module performs several iterations to provide a result which is then provided back to the cryptographic module for more iterations are considered as being within the scope of the present disclosure. In addition, while FIG. 4 illustrates certain operations, as with all processes described herein, additional operations may also be performed. For instance, as noted, a result from a cryptographic module may be transformed (e.g., through a one-way function) before being provided back to the cryptographic module. Generally, the particular algorithm illustrated in FIG. 4 is illustrative in nature and a large number of variations that employ the same principles are considered as being within the scope of the present disclosure.

Figure 5:
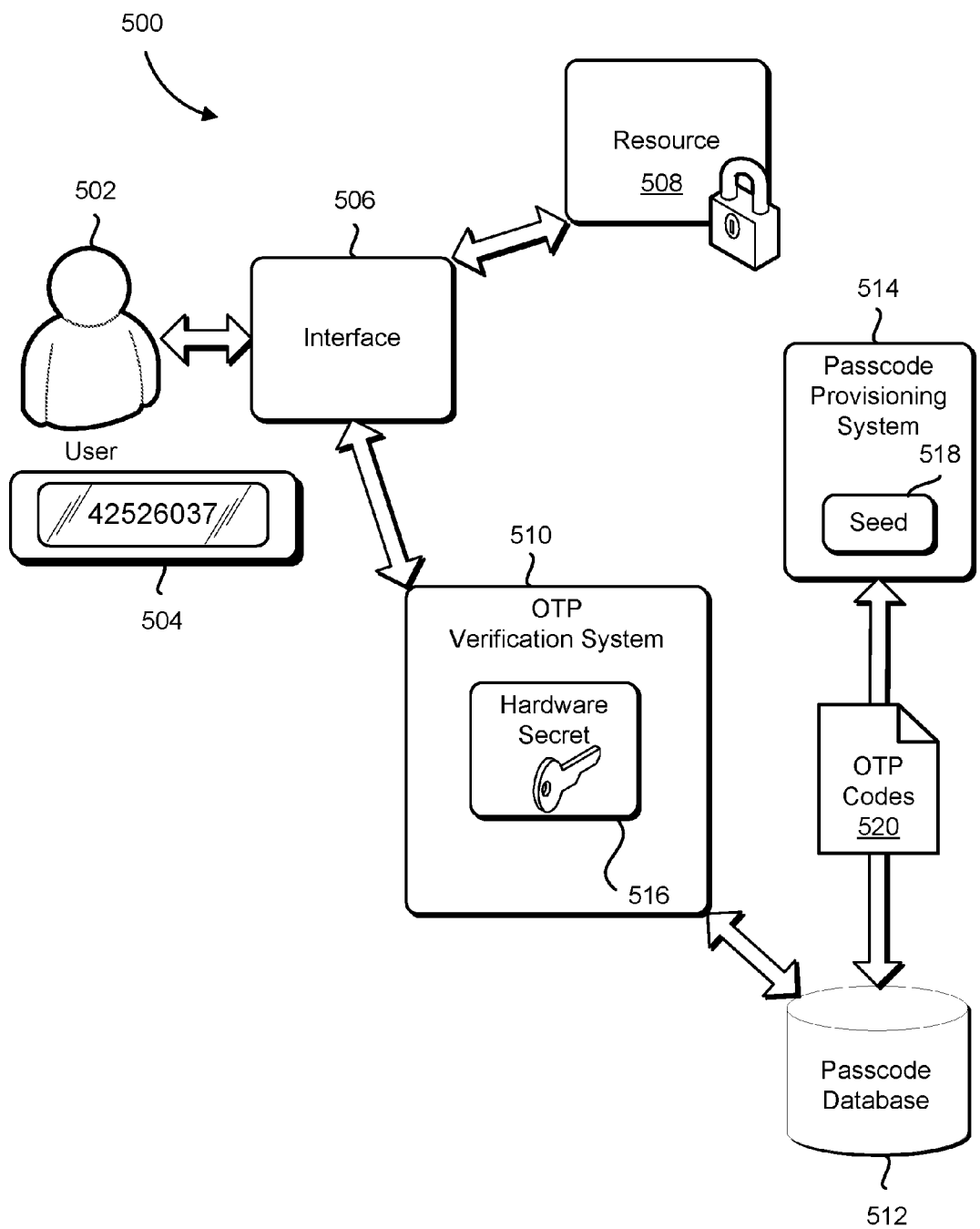
FIG. 5 shows an illustrative example of an environment in which various embodiments can be implemented.

Various embodiments of the present disclosure may also be used in connection within one time passcode/passcode (OTP) verifications systems. FIG. 5, accordingly, shows an illustrative example of an environment 500 in which various embodiments may be practiced. As illustrated in FIG. 5, a user 502 may interact with an interface 506 in order to access a resource 508, such as described above. As part of the interaction with the interface 506 the user 502 may provide a one-time passcode which may be a passcode that is valid for only one session transaction period of time or otherwise. The user may have access to a security token 504, that may be a hardware device (hard token) or programming module (soft token) on a computer system configured to generate at various time intervals a new one-time passcode based, at least in part, on a seed which may be, for example, a random value input into a one-time passcode generation algorithm. SecurID tokens produced by RSA Security LLC are illustrative examples of such tokens, although embodiments of the present disclosure are not limited to such tokens.

The user 502 may obtain a one-time passcode provided to the interface 506 for access to the resource 508. In order to control access to the resource 508 interface, it may communicate with a one-time passcode (OTP) verification system 510, which may operate to verify a passcode, such as described above. In particular a passcode provided by the user 503 through the interface 506 may be provided to the OTP verification system 510. The OTP verification system 510 may then obtain a hash of the received passcode and compare the calculated hash with a stored hash of the passcode to determine whether or not the passcode is valid. As illustrated, in some embodiments, the OTP verification system 510 has access to a passcode database 512, which stores a set of passcode hashes, such as described above, that correspond to passcodes that have been and/or will be generated by the security token of the user 502.

For example, the security token may generate one-time passcodes in accordance with a deterministic algorithm. Information stored in the passcode database 512 may include a hash of every passcode that will be generated by the security token over a period of time. For the user 502 for example, the passcode database 512 may store a hash of specified number of passcodes that will be generated by the security token upon the security tokens initialization. As another example the passcode database 512 may store a hash of each passcode that the security token will generate over a specified amount of time such as a month, a year, several years, a predetermined life of the token 504 or the like.

In order to store hashes of multiple passcodes that will be generated by a security token of the user 502 the passcode database 512 may receive the passcodes from a passcode provisioning system 514. The passcode provisioning system may be a system (e.g., computing device or programming module operating on a computing device) that is configured to deterministically generate the codes that the token 504 will generate over a time period. For example, the passcode provisioning system may have access to a seed 518, shared by the token 504, that is used by the token 504 in generating passcodes and may use the seed 518 to generate a set of passcodes that will be generated by the token 504 over time. In an embodiment, the passcode provisioning system 514 generates the codes and provides the generated codes 520 (e.g., over a network or via a physical provisioning device such as a universal serial bus (USB) dongle) to the OTP verification system 510. The OTP verification may receive the passcodes, use a hardware secret 516, such as described above, to generate hash values of the passcodes, and store the passcodes. The plaintext passcodes may then be deleted. In this manner, as described in more detail below, the OTP verification system is able to verify passcodes without the seed used by the token 504, thereby reducing the chance that unauthorized access to the seed will occur, thereby causing a security breach.

The passcodes may be encoded in various data structures, such as lists, Bloom filters, tables that associate codes with timestamps and/or otherwise. In some embodiments, the passcode provisioning system provides the passcodes in the data structure and the OTP verification system modifies the values in the data structure using the hardware secret (e.g., by calculating the hash values of the OTP codes in the provided data structure). In other embodiments, the passcode provisioning system provides the passcodes (e.g., in a list or table) and the OTP verification system generates the data structure that it will use to verify passcodes. Other variations are considered as being within the scope of the present disclosure. For example, the OTP verification system 510 and passcode provisioning system 514 may share the same hardware secret, thereby enabling the passcode provisioning system 514 to provide the passcode hashes to the OTP verification system without requiring the OTP verification system to calculate the hashes itself for populating the passcode database 512.

The OTP verification system may utilize whatever data structure the passcodes are encoded in to determine whether a passcode is valid. For example, upon receipt of a passcode from the user 502 (e.g., pursuant to user-input of the user or input from the token 504 itself), the OTP verification system may use it's hardware secret 516 to calculate a hash of the received passcode and check whether the calculated hash matches a stored hash in the passcode database 512, such as described above.

Because the passcode database 512 may store multiple passcode hashes for a single identity (e.g., the user 502, which may be one of many users for whom sets of passcodes are stored in the passcode database 512), the way in which passcodes are verified may vary among the various embodiments. For example, in some embodiments, a bloom filter may be used to make a determination whether a passcode is correct by using a calculated hash of a received passcode to determine whether the calculated hash appears in the passcode database 512. As another example, a table may associate hashes of passcodes with corresponding time intervals, each of which may be marked by a single time stamp. When a passcode is received for verification at a particular time, the OTP verification system may check whether a calculated hash of the received passcode matches that which is stored for a corresponding time interval. As yet another example, passcode hashes for a user stored in the passcode database 512 may be enumerated. When a passcode is received for verification, the OTP verification system 510 may use the hardware secret 516 to calculate a hash of the received passcode and query the passcode database 512 to determine if the calculated hash is in the database 512. If found, in addition to causing one or more operations to be performed corresponding to the passcode being verified, hashes lower in the enumeration may be electronically marked (e.g., stored in association with an indication of invalidity) as invalid, if not electronically marked as such already. In this manner, passcodes that the token 504 would have calculated in the past are no longer usable. Other variations and combinations of techniques are considered as being within the scope of the present disclosure.

Figure 6:
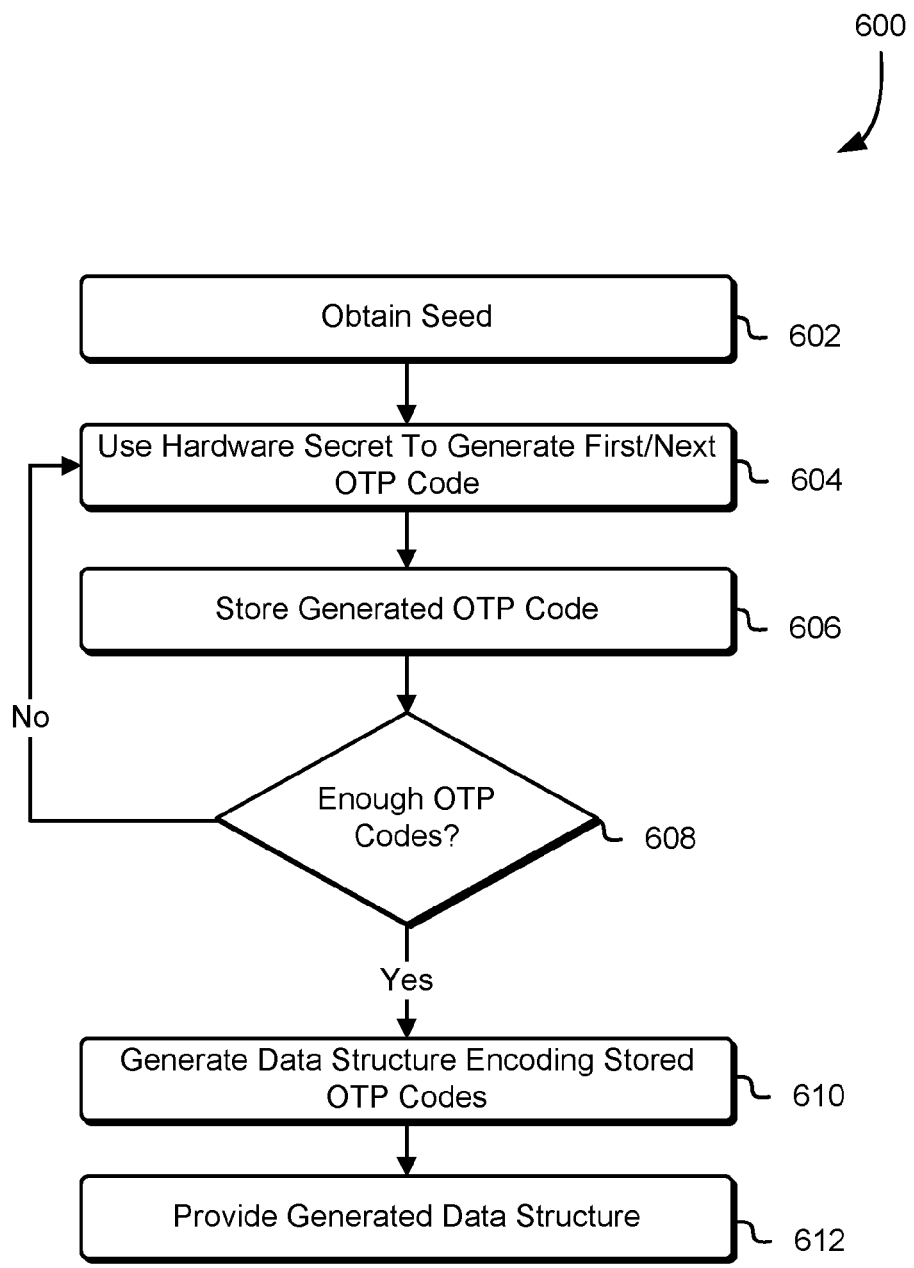
FIG. 6 shows an illustrative example of a process for populating a set of one-time passcodes in accordance with at least one embodiment.

FIG. 6 shows an illustrative example of a process 600 for provisioning a passcode database with hashes of passcodes that will be generated by a security token in accordance with various embodiments. The process 600 may be performed by any suitable system, such as by a passcode provisioning system 514 described above in connection with FIG. 5 or a suitable component thereof. In the embodiment, the process 600 includes obtaining 602 a seed. The seed may be obtained in any suitable manner. For example, the seed may be obtained as output of a random number generator. Generally, the seed may be obtained in any suitable way and the seed may match a seed provided to a token, such as the token 504 discussed above in connection with FIG. 5.

A hardware secret may then be used 604 to generate a first OTP code. Generating an OTP code may be performed in various ways in accordance with various embodiments. For example, the hardware secret, the seed and a time may be input into a function (e.g., hash function) whose algorithm for calculation, which may be iterative, is programmed into the system performing the process 600. Once the hardware secret has been used to generate the first OTP code, the generated first OTP code may be stored 606. For example, the generated OTP code may be stored in a file, database or otherwise in volatile memory and/or nonvolatile memory.

A determination may be made 608 whether enough OTP codes have been generated, where the number considered enough may be preprogrammed and/or configurable. If determined 608 that an insufficient number of OTP codes have been generated, the process 600 may include using 604 the hardware secret to generate and store 606 the next OTP code. The next OTP code, in some embodiments, is based at least in part on a previously generated OTP code (e.g., the immediately preceding generated OTP code), although in other embodiments, each OTP code may be independently generated. Generation and storage of OTP codes may repeat until it is determined 608 that a sufficient number of OTP codes have been generated. Once determined 608 that a sufficient number of OTP codes have been generated, the process 600 may include generating 610 a data structure encoding the stored OTP codes. The data structure may be configured in various ways in accordance with various embodiments, such as described above. The data structure may be provided 612 to one or more OTP verifications where, if multiple OTP verifications, each OTP verification system may be a member of a redundant fleet, each with a different hardware secret. An OTP verification may reconfigure and use the provided 612 passcodes, such as described above.

Figure 7:
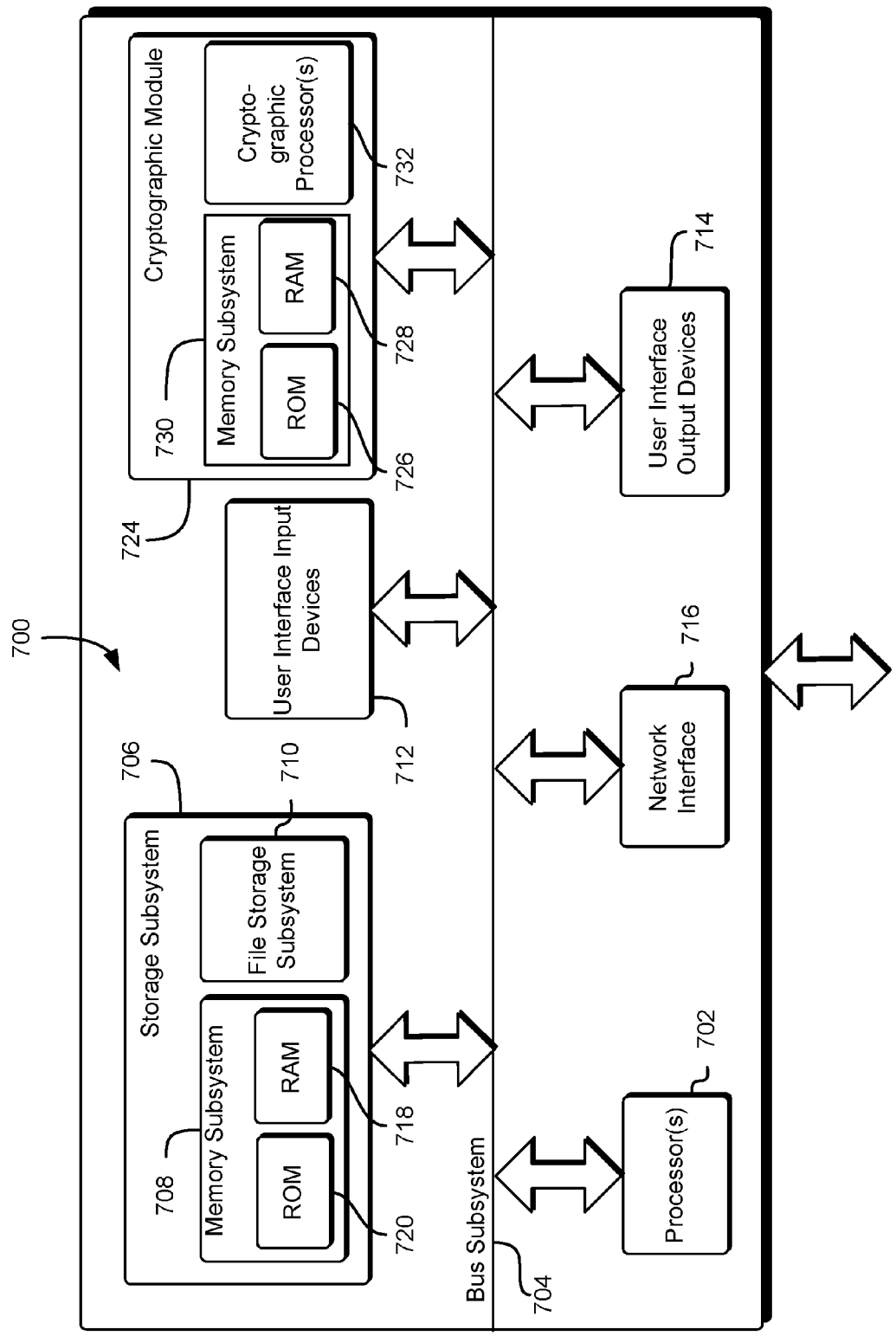
FIG. 7 shows an illustrative example of a device that may be used in accordance with various embodiments.

FIG. 7 is an illustrative, simplified block diagram of an example device system 700 that may be used to practice at least one embodiment of the present disclosure. In various embodiments, the device system 700 may be used to implement any of the systems illustrated herein and described above. For example, the device system 700 may be used to generate data (e.g., passcode hashes) for populating a database and/or to verify passcodes. As shown in FIG. 7, the device 700 may include one or more processors 702 that may be configured to communicate with and are operatively coupled to a number of peripheral subsystems via a bus subsystem 704. These peripheral subsystems may include a storage subsystem 706, comprising a memory subsystem 708 and a file storage subsystem 710, one or more user interface input devices 712, one or more user interface output devices 714, a network interface subsystem 716, a cryptographic module 724, comprising a memory subsystem 730 and one or more cryptographic processors 732.

The bus subsystem 704 may provide a mechanism for enabling the various components and subsystems of device system 700 to communicate with each other as intended. Although the bus subsystem 704 is shown schematically as a single bus, alternative embodiments of the bus subsystem may utilize multiple busses.

The network interface subsystem 716 may provide an interface to other device systems and networks. The network interface subsystem 716 may serve as an interface for receiving data from and transmitting data to other systems from the device system 700. For example, the network interface subsystem 716 may enable receipt of passcodes and provide information indicating whether received passcodes are authentic (e.g., correct). For example, a verification request may be provided to the device 700 and the network interface 716 may enable both the received and a response to be provided. The network interface subsystem 716 may also facilitate the receipt and/or transmission of data on other networks, such as an organizations intranet and/or other networks described below.

The user interface input devices 712 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones and other types of input devices. Further, in some embodiments, input devices may include devices usable to obtain information from other devices. Input devices may include, for instance, magnetic or other card readers, one or more USB interfaces, near field communications (NFC) devices/interfaces and other devices/interfaces usable to obtain data from other devices. In general, use of the term "input device" is intended to include all possible types of devices and mechanisms for inputting information to the device system 700.

User interface output devices 714, if any, may include a display subsystem, a printer or non-visual displays, such as audio output devices, etc. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 700. The output device(s) 714 may be used, for example, to present user interfaces to facilitate user interaction with applications performing processes described herein and variations therein, when such interaction may be appropriate. While a device 700 with user interface output devices is used for the purpose of illustration, it should be noted that the device 700 may operate without an output device, such as when the device 700 is operated in a server rack and, during typical operation, an output device is not needed.

The storage subsystem 706 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 706. These application modules or instructions may be executed by the one or more processors 702. The storage subsystem 706 may additionally provide a repository for storing data used in accordance with the present disclosure. The storage subsystem 706 may comprise a memory subsystem 708 and a file/disk storage subsystem 710.

The cryptographic module 724, which may be a trusted platform module, includes a memory subsystem 730, including a main random access memory (RAM) 728 for storage of instructions and data during program execution and a read only memory (ROM) 726, in which fixed cryptographic information may be stored, such as a hardware secret. The device 700 may also store keys in RAM 728 and/or processor registers for temporary cryptographic processing. The cryptographic information stored in memory may be used in combination with cryptographic information (e.g., passcode and/or information based at least in part thereon) obtained via the network interface 716 and/or one or more of the user interface input devices 712. The one or more cryptographic processors may be used to perform cryptographic operations in the device and may include a random number generator, SHA-2 or other hash generator and an encryption-decryption-signature engine. Generally, one or more components of the cryptographic module 724 may be configured to collectively perform various operations used in calculating hashes of passcodes, such as described above.

As noted above, in various embodiments of the present disclosure, hardware secrets are securely stored within the cryptographic module 724. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

In addition, the cryptographic module 724 may be configured to have certain speed and/or degradation characteristics. For example, the processing capabilities of the cryptographic module 724 may be configured to be slow relative to other processing capabilities, such as those available in commodity processing devices. In some embodiments, for instance, it may be desirable to limit the speed at which the device 700 is able to calculate hashes since, in authorized uses (e.g., password verification), slow processing (e.g., a delay of milliseconds relative to other processors available) may be insignificant to a typical authorized user who submits a password relatively infrequently (e.g., once per session), but very significant to an unauthorized user, such as someone who has stolen the device 700 and information in a passcode database and is using the device 700 to try to determine passwords from stored hash values.

Degradation characteristics may be used to limit the number of operations that the device 700 is physically able to perform. For instance, reading and/or writing to certain types of memory (e.g., flash memory or dynamic random-access memory (DRAM)) can cause the memory to become unusable over time through gradual depletion caused by read and/or write operations. The probability that a portion memory will become unusable after a number of operations may follow a probability distribution which may be determined through experimentation. Accordingly, the device 700 may be configured to perform a specified number of reads and/or writes to memory for each passcode verification. Calculation of a hash of a passcode may be programmed to require reads and/or writes to the memory. Further, the device 700 may be configured to avoid performing refresh cycles for the memory that are typically performed to slow the depletion of the memory.

The specified number may be selected such that, according to the probability distribution, the probability of the memory becoming unusable exceeds some threshold (e.g., 0.99) after a specified number of verifications (e.g., the expected number of verifications to be requested over an expected lifetime of the device 700 or a multiple thereof greater than one). Similarly, the specified number of reads and/or writes may be configured such that the probability of the device ceasing to function at some desired number of passcode verification remains within an acceptable bound (e.g., 0.01). In this manner, the device 700 can be configured to, as a matter of probability, function properly over some expected number of verifications and/or time period when used in an authorized manner (e.g., passcode verification using authorized channels), yet cease to function when used in an unauthorized manner (e.g., by attempting to determine a passcode from a hash of a passcode, which, probabilistically, will require more verifications than the device 700 is able to perform). Additional techniques may be utilized to limit the number of operations performed. For example, in some data storage devices, read operations cause degradation of memory and, to prevent degradation, the data storage devices follow read operations with a refresh operation where the data is rewritten. Devices utilizing the various techniques may be configured to avoid performance of operations configured to refresh memory and, generally, to delay degradation of memory to allow for limits to be reached sooner.

Other variations are also considered as being within the scope of the present disclosure. For example, in the above illustrative examples, stored passcode hashes are generated and verified symmetrically (using the same hardware secret). In some embodiments, however, a persistently stored passcode hash may be generated using one secret and verified using another secret. In some examples, for instance, the hardware secret may be a private key of a public-private key pair for an asymmetric cryptographic algorithm. A hash value may be calculated and persistently stored based at least in part on a public key of the public-private key pair, where the public key is not maintained as a hardware secret. Further while hash values are used throughout for the purpose of illustration, other values that are not necessarily classified as hash values may be used. For example, general output of one-way functions may be used whether or not the functions are classified as hash functions. As another example, output of invertible functions may be used. In some examples, for instance, a hardware secret may be used to generate an encrypted passcode (or encrypted data based at least in part on the passcode). When a passcode is received, the hardware secret may be encrypted to determine whether the encrypted passcode matches a stored encrypted passcode. Alternatively, a stored encrypted passcode may be decrypted using the hardware secret to determine whether the decrypted passcode matches a received passcode.

Referring back to FIG. 7, as noted, numerous variations are considered as being within the scope of the present disclosure. For example, devices that operate using hardware secrets may vary in accordance with various embodiments. Some devices may include, for instance more components than illustrated and/or described above. Some may include fewer components. As an illustrative example, a device 700 may be implemented as a smart card, chip card, subscriber identity module, or integrated circuit card. Accordingly, in some embodiments, the device 700 lacks its own power source and is able to perform operations using power supplied from another device, which may be a device requesting cryptographic operations through an interface of the device 700.

Also, as noted above, devices 700 may be implemented to have various performance limitations to restrict the number of operations that may be performed during an amount of time and/or the number of operations of a certain type that may be performed and/or in other ways. In some embodiments, limitations are programmatically enforced. A device 700 may be configured to perform only a certain number of passcode verifications per an amount of time. Such configuration may be implemented by explicitly programmed limitations on the number of operations or in other ways that effectively limit the number of operations, such as by enforcing a certain processing speed for one or more processors of the device 700. Further, a device 700 may be configured to only perform a limited number of passcode verifications before becoming inoperable to verify passcodes. In some embodiments, the limit is programmatically enforced. The device 700 may, for example, be configured to simply cease performing passcode verifications after a certain number of verifications. In some examples, the device 700 is configured with the ability to perform physically destructive operations that cause the device 700 to become physically unable to perform passcode verifications. The device may, for instance, be configured with circuitry that destroys one or more hardware secrets. The hardware secret may be, for instance, stored in programmable ROM (PROM) and overwritten after a specified number of passcode verifications. As another example, circuitry enabling use of a hardware secret may be equipped with one or more fuses. Fuses may be burned to render a hardware secret unusable to be used for passcode verification. Fuses, in some embodiments, are resettable while, in other embodiments, fuses are not resettable. As yet another example, circuitry in the device may be configured to pass a high voltage charge to a cryptographic processor, thereby rendering the cryptographic processor inoperable to utilize a hardware secret needed to verify passcodes. Other variations are included in the scope of the present disclosure including, but not limited to, the use of thermal energy (e.g., extra thermal energy applied or by a lack of cooling, such as by causing a cooling fan to become inoperable) to destroy and/or deplete one or more hardware secrets and, generally, any manner by which physical destruction of the hardware secret is achievable.

Figure 8:
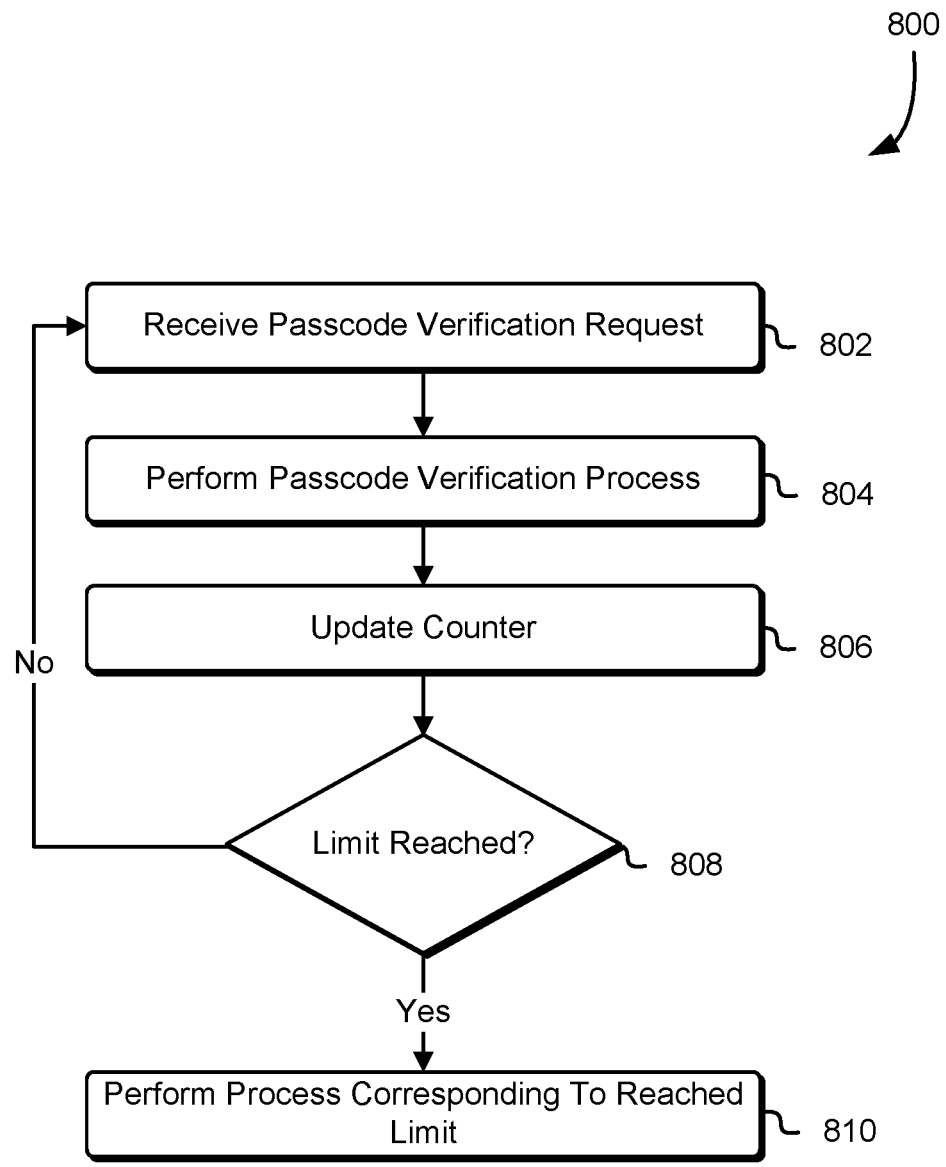
FIG. 8 shows an illustrative example of a process for enforcing a usage limit in accordance with at least one embodiment.

Turning to FIG. 8, an illustrative example of a process 800 for enforcing a limit on a number of passcode operations that a device can be performed in accordance with at least one embodiment. The process 800 may be performed by any suitable device, such as a device 700 discussed above in connection with FIG. 7. As illustrated, the process 800 includes receiving 802 a passcode verification request, which may be received in any manner and in accordance with the capabilities of the particular device performing the process 800. For example, the request may be received in accordance with any communication protocol that the device is configured to communicate in accordance with. A passcode verification process, such as described above and which may include use of a hardware secret, as above, may then be performed 804 as a result of receiving the passcode verification request. Upon performance of the passcode verification process 804 (or prior thereto), the process 800 may include updating a counter that indicates how many times a passcode verification process has been performed since a reference time, which may be since initialization of a device performing the process 800 or from another reference time, such as since a time when a device performing the process 800 has been refreshed. Updating the counter may be performed, for instance, by incrementing a counter value. In some embodiments, the counter value is stored in the same memory bank as a hardware secret for which the counter is incremented. In this manner, attempts to physically intrude into the memory to reset the counter have the result of destroying the hardware secret, thereby rendering the device performing the process 800 unable to perform additional operations using the hardware secret.

A determination may be made 808 whether a limit for the counter has been reached, whether the limit may correspond to a number of operations the device performing the process 800 has been configured to perform. If it is determined 808 that the limit has not been reached, the process 800 may proceed as discussed above as passcode verification requests are received 802. If, however, it has been determined 808 that the limit has been reached, the process 800 may include performing 810 a process corresponding to having reached the limit. The process corresponding to the reached limit may include performing one or more operations that render the device performing the process 800 to be inoperable to perform the passcode verification process, permanently or, in some embodiments, for an amount of time when one or more other actions render the device once again operable to verify passcodes. As discussed above, the process may include performing one or more operations that render the device programmatically unable to perform passcode verification requests (e.g., become configured to deny requests despite having access to a hardware secret needed to perform passcode verifications). As another example, the device may perform one or more self-destructive operations that render the device unable to perform passcode operations which may include destruction to circuitry needed to perform passcode verification and/or a hardware circuit.

Figure 9:
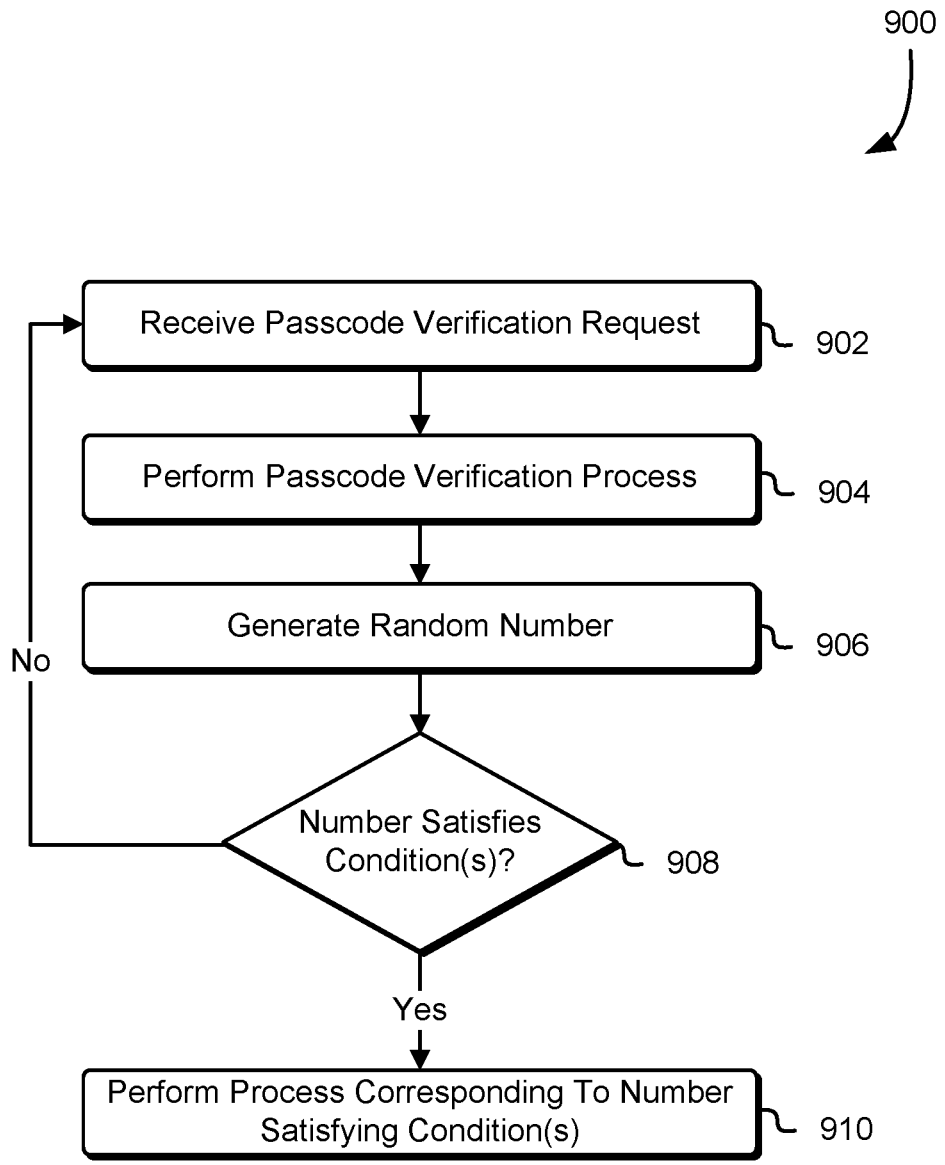
FIG. 9 shows an illustrative example of another process for enforcing a usage limit in accordance with at least one embodiment.

As noted, numerous variations for enforcing performance limits for a device performing passcode verifications are considered as being within the scope of the present disclosure. FIG. 9, for example, shows an illustrative example of a process 900 for enforcing a limit on the number of passcode verifications that are performable by a device performing the process 900 which may be, for example, the device 700 discussed above in connection with FIG. 7. The process 900, as discussed in more detail below, enforces a limit that is not explicitly programmed into the device performing the process 900. Instead, in this illustrative example, a limit is enforced using stochastic processes. In an embodiment, the process 900 includes receiving 902 a passcode verification request and performing 904 a passcode verification process, such as described above. A random number (or other value) then may be generated 906, using a suitable random number generator. As used herein, the phrase random number generator is intended to encompass pseudo-random number generators and, as a result, a random number may also be a pseudo-random number.

A determination may be made 908 whether the generated 906 random number satisfies one or more conditions. The one or more conditions may be configured such that the probability of the random number satisfying the condition(s) is within a specified range (which may be a range with zero length, such as when the probability is known exactly). The condition(s) may be configured, for instance, such that that probability of performing N operations (N a positive integer) without the condition(s) being satisfied is above a threshold value. As an illustrative example, the random number may be generated within a particular range and the one or more conditions may be a single condition that the random number is a particular value within the range. As another example, the conditions may be that a random number be equivalent to a particular number modulo M, where M is a positive integer. As yet another example, the conditions may be the random number have a specified number of leading or trailing zeros. Other conditions are also considered as being within the scope of the present disclosure.

If determined 908 that the number satisfies the one or more conditions, the process 900 may repeat as described above as passcode verification requests are received 902. If, however, it is determined 908 that the number satisfies the one or more conditions, the process 900 may include performing 910 a process corresponding to the number satisfying the one or more conditions, which may be the process corresponding to the reached limit described above in connection with FIG. 8.

Variations of the processes 800 and 900 are considered as being within the scope of the present disclosure. For example, operations of the processes 800 and 900 may be combined. In some embodiments, for example, instead of rendering a device inoperable to perform passcode verifications upon a random number satisfying one or more conditions, a counter may be updated when the number satisfies the one or more conditions. When the counter reaches a limit, the device may become inoperable to perform passcode verifications. In this manner, there is a lower probability that the device will become inoperable after a relatively few number of passcode verifications since each time a random number satisfies the one or more conditions, the counter is updated instead of causing the device to become inoperable. Thus, in the event the conditions are satisfied with a few number of passcode verifications, the device still remains operable.

Figure 10:
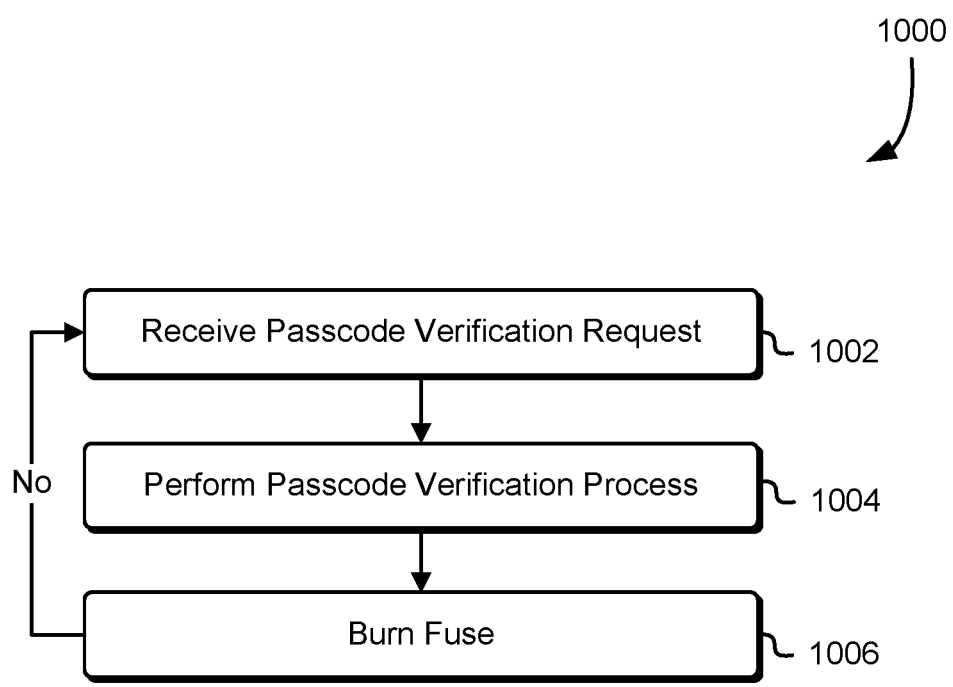
FIG. 10 shows an illustrative example of yet another process for enforcing a usage limit in accordance with at least one embodiment.

FIG. 10 shows an illustrative example of another process 1000 that may be used to enforce limits on passcode verifications. In an embodiment, a device performing the process 1000 (which may be the device 700 described above in connection with FIG. 7) is configured with fuses incorporated into its circuitry, such as through use of PROM, field programmable read-only memory (FPROM) or one-time programmable non-volatile memory (OTP NVM). In an embodiment, the process 1000 includes receiving 1002 a passcode verification request and performing 1004 a passcode verification process, such as described above. Further, after, during, or prior to performing 1004 the passcode verification process, the process 1000 may include burning 1006 a fuse. In this manner, when a sufficient number of fuses have been burned, the device performing the process 1000 becomes inoperable to perform additional password verifications (at least for a hardware secret associated with the fuses).

Variations of the process 1000 are considered as being within the scope of the present disclosure. For example, the process may vary in accordance with the number of fuses relative to the number of passcode verifications a device is allowed to perform. For instance, in some embodiments, a device maintains a counter and burns a fuse and resets the counter each time the counter reaches a specified threshold. In other embodiments, there may be more fuses than a number of passcode verifications the device is allowed to perform and, therefore, the process 1000 may include burning multiple fuses for each passcode verification. Further, stochastic techniques may be incorporated in determinations whether to burn a fuse. Referring to FIG. 9, for example, when a random number satisfies the one or more conditions, a fuse may be burned. Other variations are also considered as being within the scope of the present disclosure.

Figure 11:
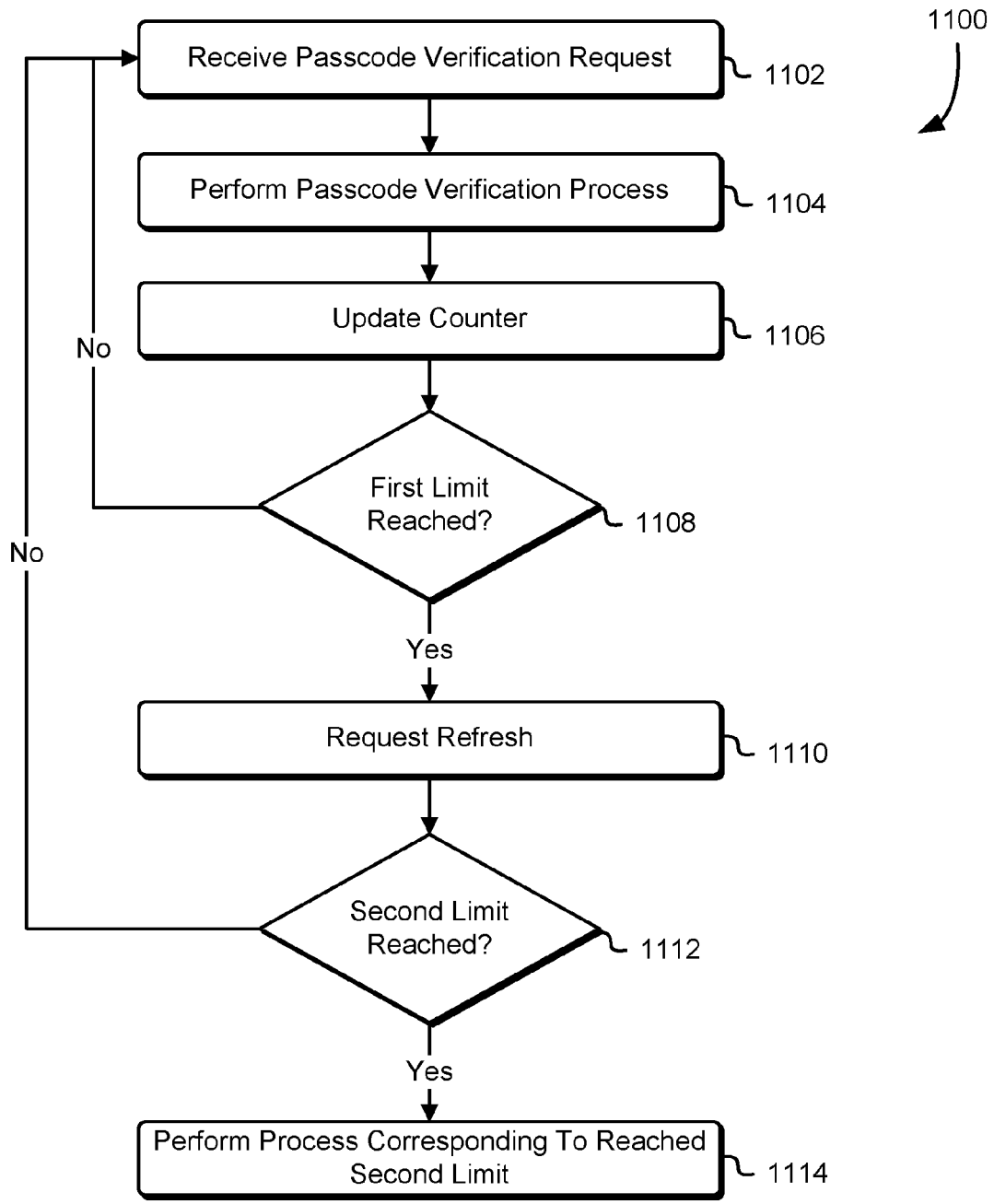
FIG. 11 shows an illustrative example of yet another process for enforcing a usage limit in accordance with at least one embodiment.

In some embodiments, a device that has become inoperable to perform passcode verifications may be refreshed so that the device is able to perform additional operations using the same hardware secret. FIG. 11, accordingly, shows an illustrative example of a process 1100 that may be used to enforce limits on numbers of passcode verifications that may be performed while allowing for refreshing of the number of operations. The process 1100 may be performed by any suitable device, such as the device 700 described above in connection with FIG. 7. In an embodiment, the process 1100 includes receiving 1102 a passcode verification request and performing 1104 a passcode verification process, such as described above. A counter, which correlates to a number of passcode may also be updated 1106. A determination may be made 1108 whether the counter has reached a first limit. The first limit may correspond to a number of operations that may be performed by the device performing the process 1100 before the device, in accordance with how it is configured, requests a refresh in the number of operations it may perform. If determined 1108 that the first limit has not been reached, the process 1100 may repeat as described above as passcode verification requests are received 1102.

When determined 1108 that the first limit has been reached, the process may include requesting 1110 a refresh. Requesting a refresh may be performed in various ways in accordance with various embodiments and in accordance with the capabilities of the device performing the process

1100. For example, the device may be configured to transmit a notification of reaching the first limit over a network to a particular IP address or to an IP address corresponding to a particular URL. As another example, if so equipped, the device may cause a display device to display an indication of a need to refresh. As yet another example, the device may store an indication of the need to refresh in memory so that the indication will be detected at a later time. For instance, in the example of an ATM, a service technician may (through an appropriate device) detect the indication when the ATM is refilled with funds. In the example of a smartcard, the indication may be stored so that the next time a smartcard is used, a user will see a prompt on a display device associated with a device reading the smartcard. In the example of a SIM card for a mobile device, the mobile device may display a notification of the need to refresh. Generally, any manner in which information indicating the need for refresh may be issued may be used and combinations of methods may also be used.

The process 1100 may also include determining 1112 whether a second limit has been reached, where the second limit may correspond to a limit on the number of operations the device performing the process 1100 may perform without refresh. If determined 1112 that the second limit has not been reached, the process 1100 may repeat as discussed above as passcode verification requests are received 1102. If, however, it is determined 1112 that the second limit has been reached, the process may include performing 1114 a process corresponding to having reached the second limit. The process corresponding to having reached the second limit may render a device performing the process 700 temporarily or permanently inoperable to verify passcodes. If inoperability is temporary, the device may remain inoperable until the device is refreshed with additional operations, if such should occur.

Figure 12:
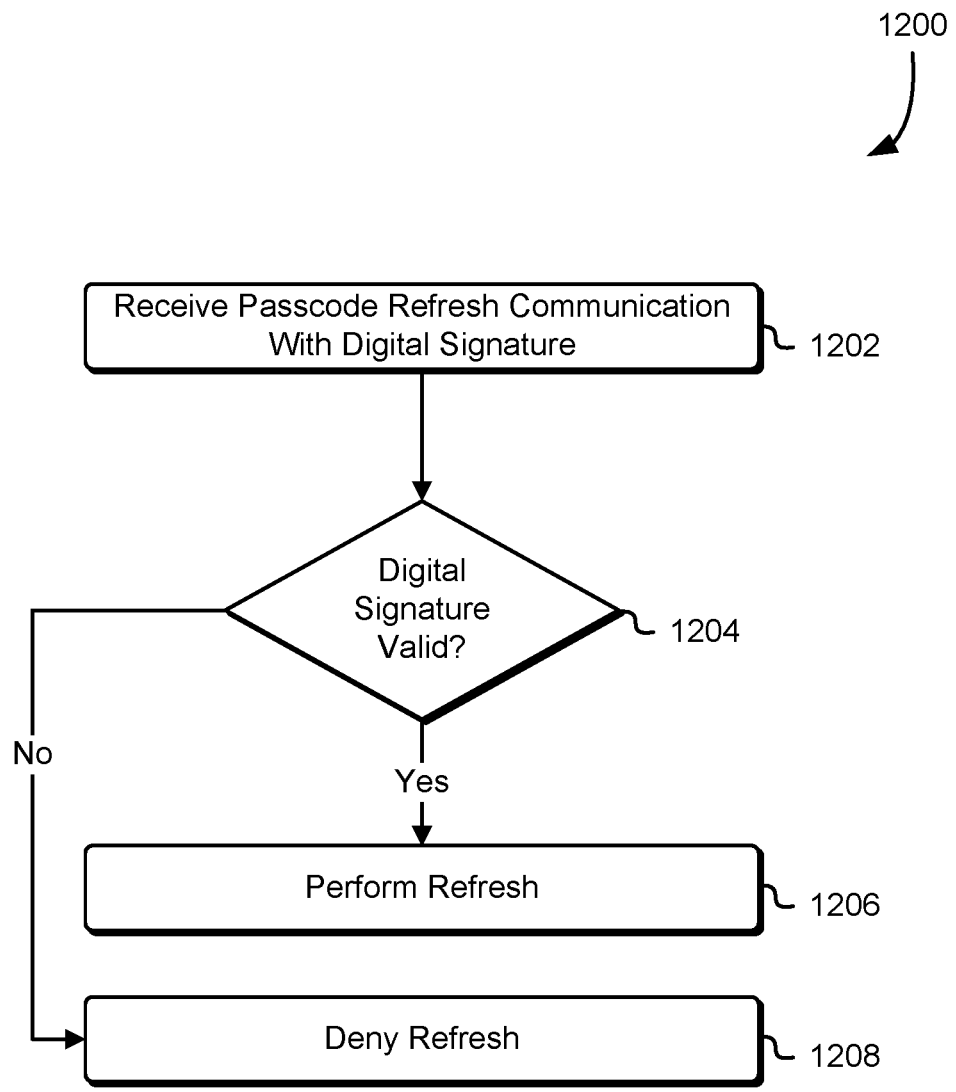
FIG. 12 shows an illustrative example of a process for increasing a usage limit in accordance with at least one embodiment.

FIG. 12 shows an illustrative example of a process 1200 which may be used to receive a refresh that enables additional passcode verifications. The process 1200 may be performed by any suitable device, such as a device 700 described above in connection with FIG. 7. In an embodiment, the process 1200 includes receiving 1202 a passcode refresh communication with a digital signature. The passcode refresh communication may be received in various ways in various embodiments, and the ways in which the communication is made may vary in accordance with the type of device performing the process 1200. For example, in some embodiments, the communication is received over a network. In other examples, the communication is received via a locally attached (e.g., physically attached device or device on a secure private network). In some embodiments, the refresh communication originates from a universal serial bus (USB) or other attachable device that is not accessible over a network. Generally, the refresh communication may be any communication formatted and transmitted in accordance with the abilities of the device performing the process 1200.

In an embodiment, the process 1200 includes determining 1204 whether the digital signature is valid. The way by which it is determined 1204 whether the digital signature is valid may vary in different embodiments. For example, in some embodiments, the digital signature is generated using a copy of a hardware secret that the device performing the process 1200 has, which may be the same hardware secret used to verify passcodes or a different hardware secret. (Copies of hardware secrets may, for example, be maintained securely, such as off of a publicly-accessible network, in an HSM, and/or otherwise). Thus, determining 1204 whether the digital signature is valid may include using the hardware secret to generate a reference digital signature based at least in part on the received communication and comparing the reference digital signature to the digital signature that was received. Similarly, the received digital signature may have been generated using a secret accessible to the device performing the process 1200, but that is not a hardware secret. Accordingly, the secret may be used to generate a reference signature that is compared with the received signature. In some embodiments, an asymmetric digital signature scheme is used. In such embodiments, the digital signature may be generated using a private key of a public-private key pair and verified by the device performing the process 1200 using a public key of the public-private key pair and possible communication with an appropriate certificate authority. Generally, any way by which the digital signature and, generally, the authenticity of the refresh communication may be verified may be used.

If determined 1204 that the digital signature is valid, the process 1200 may include performing 1206 a refresh. Performing a refresh may be performed in any suitable manner, and the manner by which the refresh is performed may vary in accordance with various embodiments. In some embodiments, performing the refresh includes resetting a counter that enables additional passcode verifications to be performed. Referring to embodiments discussed above, the reset counter may be maintained by a hardware module that is configured to perform one or more self-destructive operations that result in destruction of the hardware secret if the counter reaches a threshold. In some embodiments, performing the refresh includes receiving an update to a passcode database utilized by a device performing the process 1200, such as described above. If, however, it is determined 1204 that the digital signature is invalid, the process 1204 may include denying the refresh, which may include not resetting a counter, incrementing a counter further (e.g., to cause a self-destruct operation to occur sooner), communicating the denial and/or one or more reasons for the denial and/or otherwise.

Figure 13:
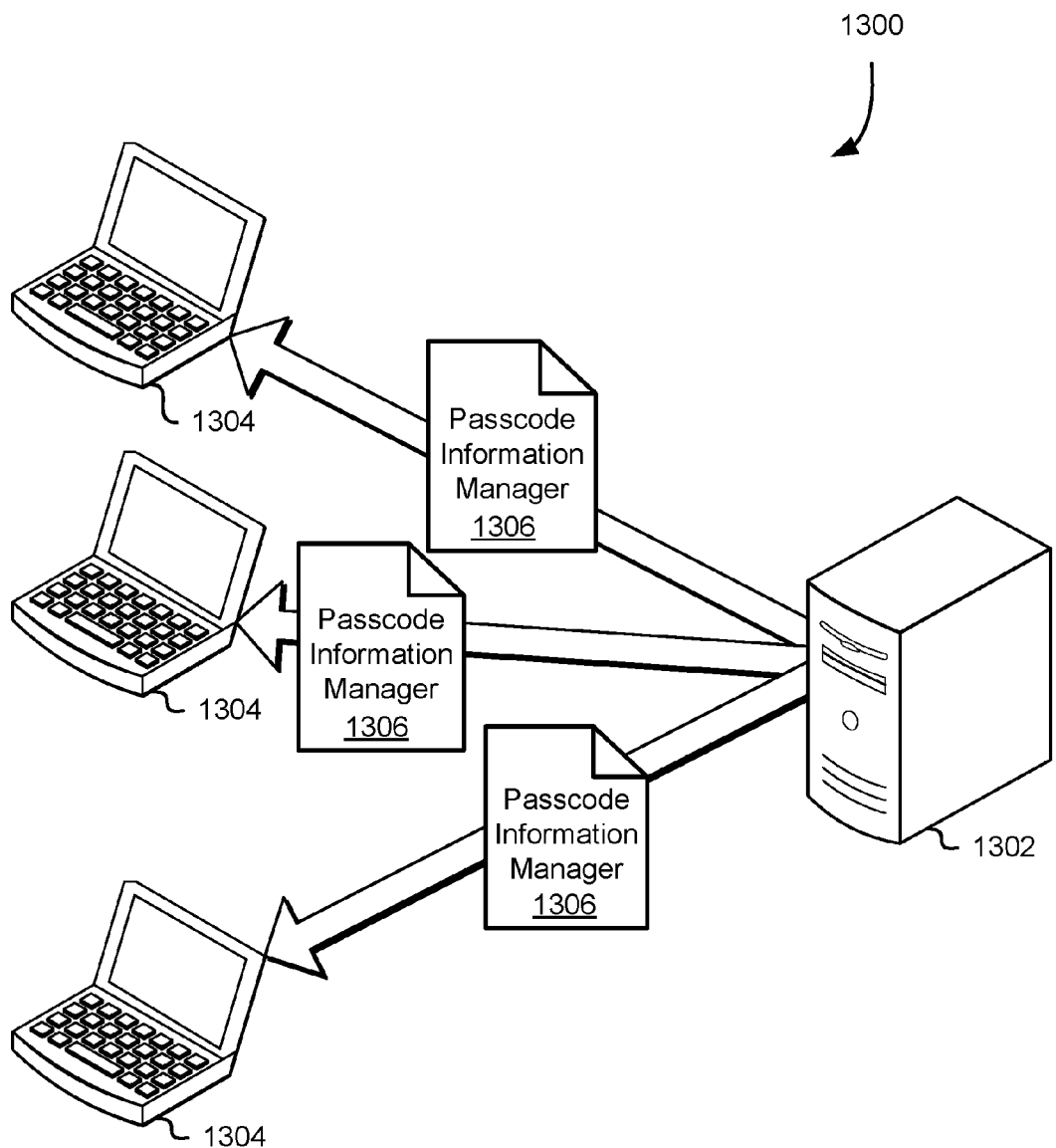
FIG. 13 shows an illustrative example of a distributed passcode verification system in accordance with at least one embodiment.

In some embodiments, the various techniques described herein are usable to implement a distributed passcode verification system where passcode verifiers are decentralized, configured to make authentication determinations using a limited number of tests, which may be a fixed number of tests or a number of tests that is otherwise limited, and/or which may be refreshed. FIG. 13 shows an illustrative example of an environment 1300 in which various embodiments may be practiced. In an embodiment, the environment 1300, includes a passcode information manager 1302 which may be a computer system or programming module operating thereon that is configured to manage passcode information for a service, such as a directory service or other system for which passcodes are used as a way to prevent unauthorized access. In an embodiment, the passcode information manager 1302 generates and provides information to a plurality of computing devices 1304, which may be laptop/notebook computer systems, tablet computer systems, and/or other computer systems. The computing devices 1304 may be configured with hardware secrets and configured to be able to perform a limited number of passcode verifications, which may be refreshable, such as described above.

In an embodiment, the passcode information manager 1302 provides passcode information 1306 to the computing devices 1304. The passcode information 1306, in an embodiment, is information usable to verify passcodes input into the computing devices 1304. The passcode information

1306 may, for instance, comprise information stored in a passcode database, discussed above. Further, in various embodiments, the passcode information includes information usable to verify passcodes corresponding to multiple users, such as a plurality of users in a corporate directory. In some embodiments, for example, the passcode information manager 1302 provides the passcode information 1306 to a computing device 1304 when the computing device 1304 connects (e.g., establishes a secure connection and/or authenticates) to a corporate or other network associated with the passcode information. The passcode information manager 1302 may, for instance, provide updated passcode information 1306 when the passcode information it manages is updated, such as when users change passcodes, new users are added to a directory and the like. In some embodiments, the passcode information is provided to the computing devices 1304 from the passcode information manager 1302 indirectly. For instance, the passcode information manager 1302 may publish the passcode information 1306 to a website, which may be a publicly accessible website, that the computing devices 1304 are configured to poll periodically or aperiodically.

In various embodiments, the computing devices 1304 are each equipped with one or more hardware secrets, such as in one or more ways described above. The passcode information 1306 for each computing device 1304 may be specifically configured for the computing device 1304 using a copy of the hardware secret. In some embodiments, the passcode information manager 1302 has access to a copy of the hardware secret of each computing device 1304. In other embodiments, passcodes are provided to another system that securely stores copies of hardware secrets for generation of passcode information. Further, in some embodiments, instead of computing device-specific passcode information, each computing device 1304 may receive the same passcode information, which may, for multiple passcodes, include multiple hash values for the same passcode, each generated using a copy of a different hardware secret. A computing device 1304 may select an appropriate hash value for verifying a passcode or may verify a passcode by using its hardware secret to generate a hash value and checking if the hash value appears in the passcode information. Other variations are also considered as being within the scope of the present disclosure.

By providing passcode information 1306 to the computing devices 1304, the computing devices 1304 are able to verify passcodes without having to be connected to a corporate or other network. Further, multiple users may be able to log in to a single computing device 1304 (thereby accessing additional computing functionality, such as operating system functionality) since the computing device 1304 has the passcode information 1306 without having to connect to a network to verify passcodes.

In some embodiments, a limit on a number of passcode verifications that may be performed by a computing device 1304 may be refreshed each time the computing device connects to a specified network (e.g., corporate network) using techniques described above. Moreover, because of a limited number of passcode verifications that are performable, theft or other unauthorized access to a computing device 1304 provides effectively zero information usable to gain unauthorized access to sensitive information. For example, the limit on passcode verifications that may be performed may be configured such that brute force (e.g., passcode guessing) attacks are highly probable (e.g., are probable above some specified probability) to fail before the computing device 1304 becomes unable to perform additional passcode verifications, possibly due to physical self-destruction, in some embodiments. However, as noted, as long as the computing device 1304 regularly performs one or more specified operations (e.g., connecting to a corporate network), the limit is refreshed so that the computing device 1304 remains able to perform passcode verifications for multiple users.

Figure 14:
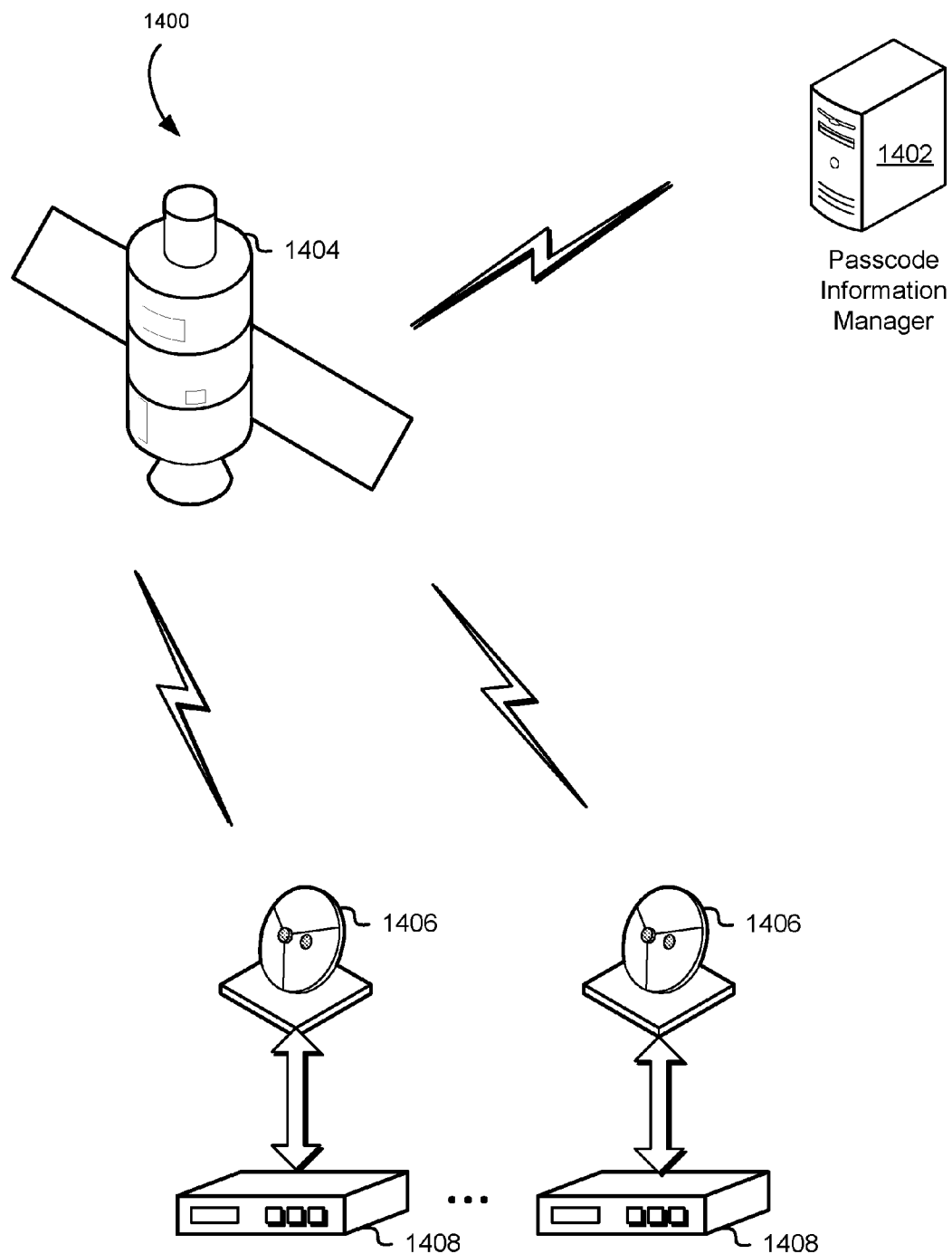
FIG. 14 shows an illustrative example of a distributed passcode verification system in accordance with at least one embodiment.

The techniques illustrated in FIG. 13 are also usable in other contexts. For example, FIG. 14 shows an illustrative example of an environment 1400 in which various techniques of the present disclosure may be used. The environment 1400, in this example, includes a passcode information manager 1402, which may be a system or programming module operating thereon configured to manage passcode information such as described above. The passcode information manager 1402 may be configured to cause the transmission of passcode information, such as described above in FIG. 13, although in the environment 1400, the passcode information manager 1402 may utilize appropriate systems (e.g., satellite uplink system, not shown) to transmit the passcode information to a satellite 1404 or other system for distributing content and other information associated therewith (e.g., passcode information). Further, passcode information may include additional information, such as information associated with accounts that indicates what content each account is allowed to view. For example, in addition to a hash of a passcode generated based at least in part on a hardware secret and associated with an account, the passcode information may include information indicating a set of channels that the corresponding account is allowed to view (i.e., have decoded). Information may be provided to/from the satellite 1404 utilizing one or more appropriate protocols, such as the digital video broadcasting (DVB) S2, Integrated Services Digital Broadcasting (ISDB)-S and/or S-Digital Multimedia Broadcasting (DMB) protocol.

Passcode information received by the satellite 1404 from the passcode information manager 1402 may be transmitted through one or more satellite antennas (dishes) 1406 to corresponding satellite receivers 1408. A satellite receiver, in an embodiment, is a device configured to convert signals received from a satellite antenna 1406 into signals appropriate for media consumption (e.g., by converting to a video signal). In various embodiments, a satellite receiver 1408 receives signals for multiple sources of content (e.g., television channels). The sources for which a receiver 1408 will convert signals to video signals (which may include decryption of encrypted content) may vary among customers in accordance with various account types of a content provider. For example, one user may have a basic programming package that provides access to a first set of channels while a second user may have a costlier programming package that provides access to a larger, second set of channels. The satellite receivers 1408 may be configured to receive and, using a hardware secret as described above, verify passcodes to determine which channels to decode.

In an embodiment, because the passcode information provided to the satellite receivers 1408 is usable to verify passcodes for multiple accounts, users are able to provide credentials to others' satellite receivers in order to access decoded content. For example, a first user may have a first programming package and a second user may have a second programming package with a channel that is not available in the first programming package. The second user may log into the first user's satellite receiver to access the channel not available in the first programming package. If the first user and second user are friends, for example, and want to watch programming together, the users are not limited to using the second user's satellite receiver because the second user is able to log in using any receiver that is configured to be able to receive and utilize the passcode information transmitted form the satellite 1404.

Various techniques described above may be incorporated into operation of the environment 1400. For example, as noted, satellite receivers may be configured with hardware secrets that are used to verify passcodes. In some embodiments, each satellite receiver may be configured with the ability to perform a limited number of tests before becoming inoperable to verify passcodes, at least temporarily. In some embodiments, each satellite receiver is provided with a fixed number of tests that is periodically refreshed (e.g., once per month) by transmissions from the satellite 1404 (or by another channel, such as an Internet connection to the satellite receiver 1408). The fixed number (or other limit) may be configured such that a satellite receiver is able to perform a number of passcode verifications that is likely to exceed an amount actually needed (e.g., several hundred per month), but such that any brute force or other attack to determine the hardware secret or otherwise enable unauthorized access to programming would render the satellite receiver inoperable, either permanently or until refreshed.

The environment 1400 is illustrative in nature and the techniques discussed herein are applicable in a wide variety of contexts. For example, in some embodiments, a device configured to perform a limited number of passcode verifications may be configured to control unauthorized access to software functionality, such as for high-value software. In some embodiments, for instance, a dongle (e.g., device that communicates with a computer system via a USB connection) is required for access to some or all software functionality. A software application may be configured to periodically or otherwise provide a challenge to the dongle and the dongle must use a hardware secret to successfully complete the challenge. (For instance, in some embodiments, the dongle must compute a hash value from a hardware secret to be checked by a computer system that, as a result of executing the software, has a copy of the hash value or is able to determine the hash value). The software may be configured such that some or all functionality requires the dongle to successfully complete the challenge. In other embodiments, the software includes obfuscated (e.g., encrypted) code that is unobfuscatable using a hardware secret in the dongle. To utilize functionality dependent on the code, the software may require that the code become unobfuscated, which would require the dongle to unobfuscate (e.g., decrypt) the code. In other embodiments, certain functionality may require code stored on the dongle in a manner obfuscated so as to be unobfuscatable using a hardware secret of the dongle. The software may cause a system executing the software to make calls to the dongle (e.g., by way of a dynamic-link library), to cause the dongle to use its hardware secret to deobfuscate and perform operations using its code to thereby allow for full functionality. Such a dongle may have access to a limited number of passcode verifications that is configured to be enough for a useful life of the software (e.g., enough passcode verifications expected to be needed for a specified number of years), but too few to make unauthorized access to the dongle effectively useless to enable a successful cryptographic attack to gain unauthorized access to software functionality. As above, a dongle may be configured to cease operating using a hardware secret, to perform self-destructive operations, and/or to be refreshable.

In other embodiments, the techniques described and suggested herein are applicable to documents rights management. A corporate computer (e.g., notebook computer) may, for instance, require use of a hardware secret to access documents in a corporate document repository (e.g., document management system). The computer may have access to a limited number of operations where the limit is based at least in part on a determination of a reasonable number of documents an employee would need to access during a time period (e.g., the life of the computer, a month (if the limit is refreshable)). For example, each attempt to access a document must require use of a hardware secret to be successful, in some embodiments. In this manner, normal use of the computer does not invoke the limit, but unauthorized events, such as a mass export of documents from the document repository may trigger the limit and, thereby, prevent such an unauthorized mass export.

Further, as noted, limits on passcode verifications may be enforced in various ways in accordance with various embodiments. For example, in some embodiments, limits are statistically enforced such that a rate at which passcode verifications (or other, related operations) are performed is limited by a maximum value and a maximum average value, where verifications at a rate faster than the maximum average value are allowed as long as the average number of verifications performed must remain at or below the maximum average value.

Further, while various embodiments are described in connection with particular cryptographic processes (e.g., verifying passcodes through hash value calculations), the techniques described and suggested herein are applicable in other contexts with other types of cryptographic operations, such as encryption and decryption. In some embodiments, the techniques described and suggested herein are used in connection with full disk encryption for computing devices. A computer may need to decrypt a local storage device (e.g., hard drive) at each reboot (or other event). A cryptographic module (e.g., a TPM) of the computer may be provided with a limited number of decryptions utilizing one or more of the techniques described above. Connections to a corporate or other network may cause the limit to be refreshed, either each time or if the number of decryptions and/or other related operations drops below a threshold. In this manner, if the computer is stolen or otherwise compromised, only a limited number of login attempts are allowed before decryption is no longer possible (permanently or until refresh). As a result, compromise of data stored on the computer is prevented.

Further enhancements of the various techniques described and suggested herein are also considered as being within the scope of the present disclosure. For example, some devices may have location sensing capabilities (such as global positioning system (GPS) capabilities) where the devices are able to receive signals (e.g., from satellites, cellular towers, wireless routers and/or other sources) and determine their proximate locations from the signals. Such a device may be configured to only perform cryptographic operations using a hardware secret when the device detects that it is in an approved location, which may be defined as within a specified radius of a geographic point. Other variations are also considered as being within the scope of the present disclosure.

Figure 15:
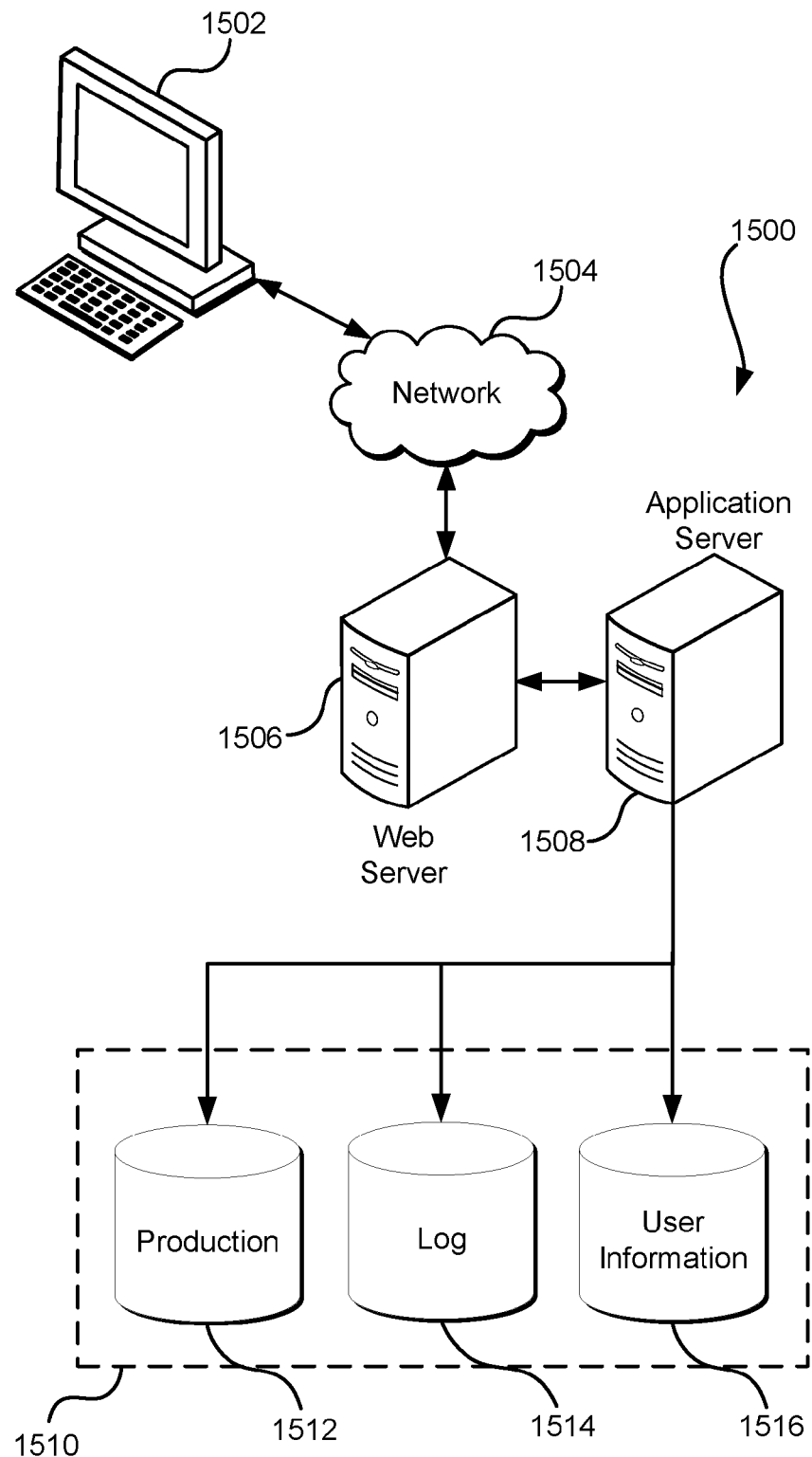
FIG. 15 illustrates an environment in which various embodiments can be implemented.
Figure 13:
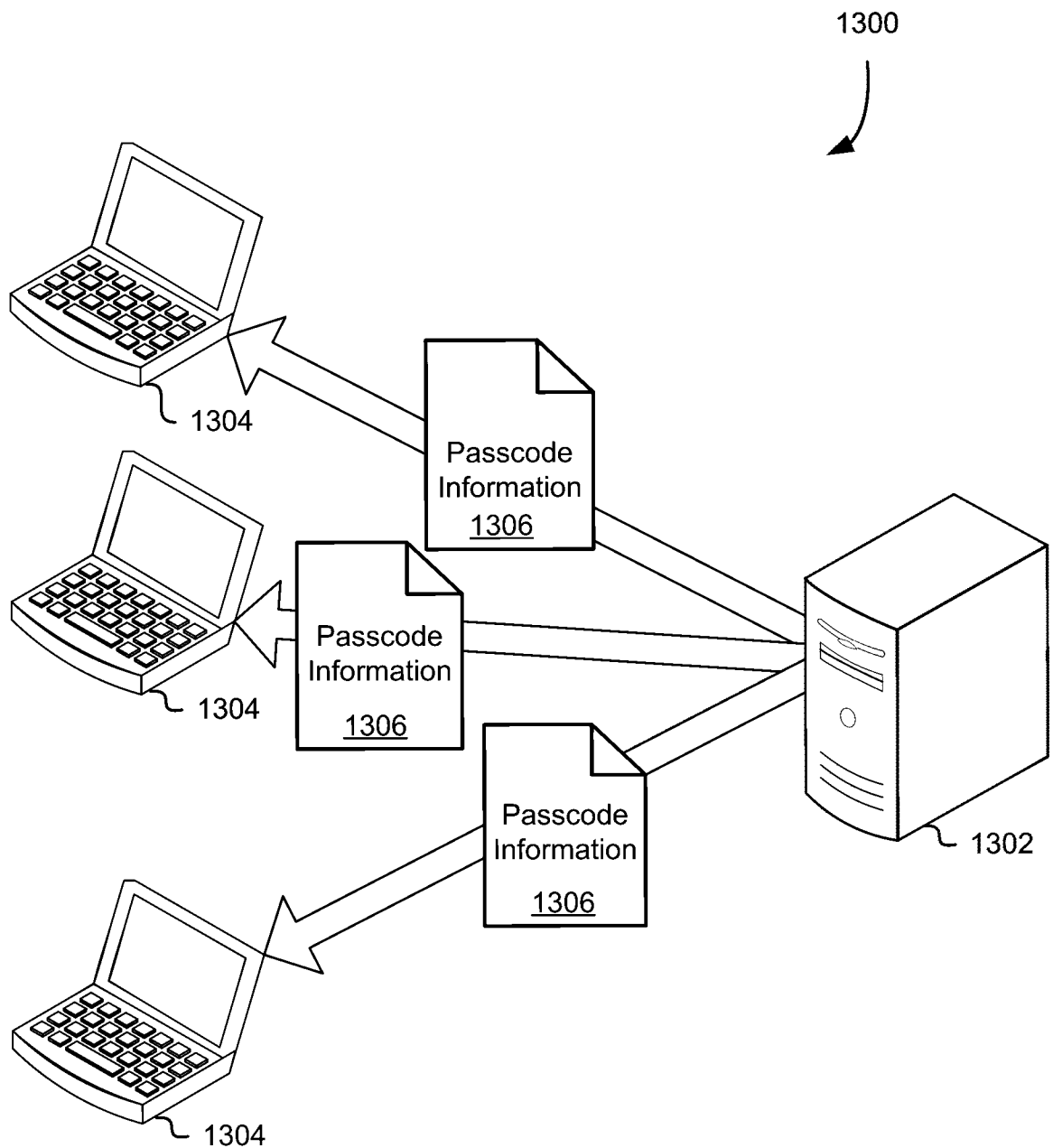

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages or information over an appropriate network 1504 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1502 and the application server 1508, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1510 can include several separate data tables, databases, data documents, dynamic data storage schemes and/or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. The application server 1508 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   storing, in a computing device, a secret that:
     has a usage limit that corresponds to a limit on a number or rate of cryptographic operations performable using the secret, the computing device being unable to unilaterally exceed the usage limit; and
     is securely stored by the computing device so as to be at least programmatically unexportable from the computing device;
   performing one or more cryptographic operations using the secret, where, as a result of the secret being associated with the usage limit, the one or more operations are performed in accordance with the usage limit; and
   providing a result of performance of the one or more cryptographic operations.

2. The computer-implemented method of claim 1, wherein the usage limit controls a total number of calculations involving the secret performable by the computing device before the device is unable to perform cryptographic operations using the secret.

3. The computer-implemented method of claim 2, further comprising performing one or more operations that cause the usage limit to be increased as a result of authorization for an increase to the usage limit from another computing device.

4. The computer-implemented method of claim 1, wherein the usage limit controls a rate at which calculations involving the secret are performable by the computing device.

5. The computer-implemented method of claim 1, further comprising, as a result of reaching the usage limit, performing one or more operations that cause physical destruction to the computing device thereby disenabling the computing device from performing cryptographic operations involving the secret.

6. The computer-implemented method of claim 1, wherein:
   a request originates from a second computing device communicatively attached to the computing device; and
   providing the result of performance of the one or more cryptographic operations enables functionality of the second computing device.

7. A device, comprising:
   one or more processors; and
   memory;
   wherein the memory and one or more processors are collectively configured such that:

the device stores secret information so as to be unexportable from the device;

the one or more processors perform cryptographic operations using the secret information subject to a usage limit associated with the secret information that serves as a limit on a number of cryptographic operations performable by the one or more processors, the usage limit different from a clock rate limit for the one or more processors and the device being unable to unilaterally reset the usage limit; and the device provides results of performance of the cryptographic operations.

8. The device of claim 7, wherein the cryptographic operations include passcode verification.

9. The device of claim 7, wherein the cryptographic operations include decryption of data encrypted under the secret information.

10. The device of claim 7, further comprising an interface that receives requests locally from another device, each request of the received requests being fulfillable by performance of at least one cryptographic operation using the secret information.

11. The device of claim 7, wherein:

the limit on the number of cryptographic operations is a limit for a total number of cryptographic operations using the secret information performable by the device; and the one or more processors further destroy the secret information as a result of reaching the total number of cryptographic operations.

12. The device of claim 7, wherein:

the device further comprises a plurality of fuses; and the one or more processors further enforce the usage limit by burning the fuses.

13. The device of claim 7, wherein:

the device further comprises an interface that enables communication with another device; and the one or more processors, as a result of receiving information indicating authorization by the other device to refresh the usage limit, enable the device to perform additional cryptographic operations beyond the usage limit.

14. The device of claim 7, wherein:

the cryptographic operations are cryptographic verifications each having a positive or negative outcome; and the usage limit applies to both cryptographic verifications having positive outcomes and cryptographic verifications having negative outcomes.

15. A non-transitory computer-readable storage medium having stored thereon instructions that, as a result of execution by one or more processors of a device, cause the device to:

detect a requirement for performance of one or more cryptographic operations using a secret stored in the device so as to be unexportable from the device;

as a result of detecting the requirement, cause a component of the device having access to the secret to perform the one or more cryptographic operations in accordance with a usage limit applied to the secret, the device unable to unilaterally reset the usage limit, the usage limit corresponding to a limit on a number or rate of cryptographic operations performable using the secret; and provide a result of performance of the one or more cryptographic operations.

16. The non-transitory computer-readable storage medium of claim 15, wherein the usage limit corresponds to a fixed number of cryptographic operations performable by the device.

17. The non-transitory computer-readable storage medium of claim 16, wherein the instructions further comprise instructions that, as a result of execution by the one or more processors of the device, cause the device to receive authorization to increase the fixed number.

18. The non-transitory computer-readable storage medium of claim 15, wherein the usage limit limits a rate at which cryptographic operations using the secret are performable by the device.

19. The non-transitory computer-readable storage medium of claim 15, wherein the instructions further comprise instructions that, as a result of execution by the one or more processors, cause the device to detect a trigger and, as a result of detecting the trigger, request an increase to the usage limit from another device.

20. The non-transitory computer-readable storage medium of claim 19, wherein the trigger is attainment of a first usage limit different from the usage limit.

* * * * *

UNITED STATES PATENT AND TRADEMARK OFFICE
CERTIFICATE OF CORRECTION

PATENT NO. : 9,985,975 B2  
APPLICATION NO. : 15/068446  
DATED : May 29, 2018  
INVENTOR(S) : Gregory Branchek Roth et al.

Page 1 of 5

It is certified that error appears in the above-identified patent and that said Letters Patent is hereby corrected as shown below:

In the Drawings

Fig. 13 should be replaced with the corrected fig. 13 as shown on the attached page In the Specification Column 1, Lines 6-14:
This application is a continuation of U.S. Application No. 14/149,710, filed January 7, 2014, entitled "HARDWARE SECRET USAGE LIMITS," which incorporates by reference for all purposes the full disclosure of co-pending U.S. Application No. 14/149,698, filed January 7, 2014, entitled "PASSCODE VERIFICATION USING HARDWARE SECRETS" and U.S. Patent Application No. 14/149,721, filed January 7, 2014, entitled "DISTRIBUTED PASSCODE VERIFICATION SYSTEM."
Should read as:
This application is a continuation of U.S. Patent Application No. 14/149,710, filed January 7, 2014, now U.S. Patent No. 9,292,711, entitled "HARDWARE SECRET USAGE LIMITS," which incorporates by reference for all purposes the full disclosure of U.S. Patent Application No. 14/149,698, filed January 7, 2014, now U.S. Patent No. 9,369,461, entitled "PASSCODE VERIFICATION USING HARDWARE SECRETS," and U.S. Patent Application No. 14/149,721, filed January 7, 2014, now U.S. Patent No. 9,374,368, entitled "DISTRIBUTED PASSCODE VERIFICATION SYSTEM."

Column 6, Line 2:
various security measures. The hardware device for example
Should read as:
various security measures. The hardware device, for example, Column 6, Line 25:
noted however, that while hardware secrets, for which there Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*

Should read as:
noted, however, that while hardware secrets, for which there

Column 6, Line 51:
passcode database 110 is a local storage devise of passcode
Should read as:
passcode database 110 is a local storage device of passcode Column 7, Lines 4-5:
512. For example, the hash of the passcodes may be or otherwise may be based at least in part on a keyed-hashed
Should read as:
512. For example, the hash of the passcodes may be based at least in part on a keyed-hashed Column 7, Line 13:
strict mathematical definition of one way functions.
Should read as:
strict mathematical definition of one way one-way functions.

Column 7, Line 65:
passcode to the passcode verification system over the network
Should read:
passcode to the passcode verification system 106 over the network Column 9, Line 32:
connection with FIG. 1. The passcode verification system,
Should read:
connection with FIG. 1. The passcode verification system 106, Column 9, Line 53:
be denied access to the resource 208, at least until the user
Should read as:
be denied access to the resource 208, at least until the user 202

Column 9, Line 65:
input the passcode one or more input devices of a system
Should read as:
input the passcode to one or more input devices of a system Column 14, Lines 15-16:
security token upon the security tokens initialization. As another example the passcode database 512 may store a hash
Should read as:
security token upon the security tokens token's initialization. As another example, the passcode database 512 may store a hash Column 14, Lines 21-23:
generated by a security token of the user 502 the passcode database 512 may receive the passcodes from a passcode provisioning system 514. The passcode provisioning system
Should read as:
generated by a security token of the user 502, the passcode database 512 may receive the passcodes from a passcode provisioning system 514. The passcode provisioning system 514

Column 14, Lines 27-28:
will generate over a time period. For example, the passcode provisioning system may have access to a seed 518, shared
Should read as:
will generate over a time period. For example, the passcode provisioning system 514 may have access to a seed 518, shared Column 14, Line 36:
verification system 510. The OTP verification may receive
Should read as:
verification system 510. The OTP verification system 510 may receive Column 14, Line 41:
verification system is able to verify passcodes without the
Should read as:
verification system 510 is able to verify passcodes without the Column 14, Lines 48-49:
passcode provisioning system provides the passcodes in the data structure and the OTP verification system modifies the
Should read as:
passcode provisioning system 514 provides the passcodes in the data structure and the OTP verification system 510 modifies the Column 14, Line 54:
list or table) and the OTP verification system generates
Should read as:
list or table) and the OTP verification system 510 generates Column 14, Line 64:
The OTP verification system may utilize whatever data
Should read as:
The OTP verification system 510 may utilize whatever data Column 15, Line 1:
input from the token 504 itself), the OTP verification system
Should read as:
input from the token 504 itself), the OTP verification system 510

CERTIFICATE OF CORRECTION (continued)
U.S. Pat. No. 9,985,975 B2

Column 15, Line 11:
For example, in some embodiments, a bloom filter
Should read as:
For example, in some embodiments, a Bloom filter Column 15, Line 19:
the OTP verification system may check whether a calculated
Should read as:
the OTP verification system 510 may check whether a calculated Column 17, Lines 17-18:
While a device 700 with user interface output devices is used for the purpose of illustration,
Should read as:
While a device 700 with user interface output devices 714 is used for the purpose of illustration, Column 17, Lines 50-51:
interface input devices 712. The one or more cryptographic processors may be used to perform cryptographic operations
Should read as:
interface input devices 712. The one or more cryptographic processors 732 may be used to perform cryptographic operations Column 21, Line 48:
If determined 908 that the number satisfies the one or
Should read as:
If it is determined 908 that the number satisfies does not satisfy the one or Column 22, Line 54:
passcode may also be updated 1106. A determination may be
Should read as:
passcodes may also be updated 1106. A determination may be Column 23, Line 31:
may render a device performing the process 700 temporarily
Should read as:
may render a device performing the process 1100 temporarily Column 26, Line 45:
vision channels). The sources for which a receiver 1408 will
Should read as:
vision channels). The sources for which a satellite receiver 1408 will Column 27, Line 4:
form the satellite 1404.
Should read as:
from the satellite 1404.